US006841217B2

(12) United States Patent
Nishihara et al.

(10) Patent No.: US 6,841,217 B2
(45) Date of Patent: Jan. 11, 2005

(54) OPTICAL INFORMATION RECORDING MEDIUM AND METHOD FOR MANUFACTURING THE SAME

(75) Inventors: Takashi Nishihara, Hirakata (JP); Rie Kojima, Kadoma (JP); Noboru Yamada, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 33 days.

(21) Appl. No.: 10/392,164

(22) Filed: Mar. 19, 2003

(65) Prior Publication Data

US 2003/0180473 A1 Sep. 25, 2003

(30) Foreign Application Priority Data

Mar. 20, 2002 (JP) ......................................... 2002-078359

(51) Int. Cl.[7] .................................................. B32B 3/02
(52) U.S. Cl. .................... 428/64.1; 428/64.5; 428/64.6; 430/270.13
(58) Field of Search ............................. 428/64.1, 64.4, 428/64.5, 64.6, 913; 430/270.13, 495.1, 945

(56) References Cited

U.S. PATENT DOCUMENTS

| 6,456,584 | B1 | 9/2002 | Nagata et al. | |
|---|---|---|---|---|
| 2001/0041304 | A1 | 11/2001 | Uno et al. | |
| 2003/0138669 | A1 * | 7/2003 | Kojima et al. | ......... 428/694 ST |
| 2004/0023069 | A1 * | 2/2004 | Kojima et al. | ........... 428/694 T |

FOREIGN PATENT DOCUMENTS

| EP | 0 825 595 | 2/1998 |
|---|---|---|
| JP | 5-109115 | 4/1993 |
| JP | 8-77604 | 3/1996 |
| JP | 10-275360 | 10/1998 |
| JP | 12(2000)-36130 | 2/2000 |
| JP | 2001-67722 | 3/2001 |
| WO | 97/34298 | 9/1997 |

OTHER PUBLICATIONS

"Basics and Applications of Optical Disk Storage", Chapter 2 (with partial English translation) Yoshito Tsunoda et al., The Institute of Electronics, Information and Communication Engineers, 1995.
"Phase–Change Optical Disk Having a Nitride Interface layer" Noboru Yamada et al., Jpn. J. Appl. Phys. vol. 37, pp. 2104–2110, Apr. 1998.
"Wave Optics", Chapter 3 (with the partial English translation) Hiroshi Kubota, Iwanami Shoten, 1971.

* cited by examiner

*Primary Examiner*—Elizabeth Mulvaney
(74) *Attorney, Agent, or Firm*—Merchant & Gould P.C.

(57) ABSTRACT

An optical information recording medium according to the present invention includes at least one information layer in which a first dielectric film that contains Cr, O and at least one element (M1) selected from Zr and Hf, a recording film that is provided on the first dielectric film and changed in optical property reversibly by irradiation of laser beams, and a second dielectric film that is provided on the recording film and contains Cr, O and the at least one element (M1) selected from Zr and Hf, are provided in this order from a side on which laser beams are incident. The first dielectric film has a Cr atom concentration of at least 6 at %, the second dielectric film has a Cr atom concentration of at least 9 at %, and the Cr atom concentration of the second dielectric film is larger than the Cr atom concentration of the first dielectric film.

41 Claims, 6 Drawing Sheets

OPTICAL INFORMATION RECORDING MEDIUM AND METHOD FOR MANUFACTURING THE SAME

BACKGROUND OF THE INVENTION

1. Field of the Invention

The present invention relates to an optical information recording medium with respect to which information recording, erasing, rewriting and reproduction can be performed by, for example, irradiation of laser beams, and a method for manufacturing the same.

2. Related Background Art

Phase change type optical information recording media have been known as optical information recording media with respect to which information recording, erasing, rewriting and reproduction are performed by using laser beams. Information recording, erasing and rewriting are performed with respect to a phase change type optical information recording medium by utilizing a phenomenon in which a recording material is changed in phase reversibly between a crystalline phase and an amorphous phase. Generally, when recording information, a recording material is allowed to melt by irradiation of a laser beam at a high power (recording power) and cooled rapidly, so that a portion of the recording material subjected to the irradiation of the laser beam (laser beam irradiated portion) is changed in phase to an amorphous phase, thereby allowing the information to be recorded. When erasing the information, the recording material is raised in temperature and cooled gradually by irradiation of a laser beam at a lower power (erasing power) than the power used for recording, so that the laser beam irradiated portion is changed in phase to a crystalline phase, thereby allowing the information that has been recorded to be erased. Thus, in a phase change type optical information recording medium, a laser beam that modulates in power level between a high power level and a low power level is irradiated onto a recording material, thereby making it possible to record new information while erasing information that has been recorded, i.e., to perform information rewriting (see, for example, "Basics and Application of Optical Disk Storage" by Yoshito TSUNODA et al., The Institute of Electronics, Information and Communication Engineers, 1995, Chapter 2)

Examples of phase change type optical information recording media include a 4.7 GB/DVD-RAM that has been commercialized by the inventors of the present invention. FIG. 6 shows an optical information recording medium 101 having the same configuration as that of the 4.7 GB/DVD-RAM. In the optical information recording medium 101, a substrate 102, an information layer 103, an adhesive layer 104 and a dummy substrate 105 are arranged in this order from a laser beam incidence side. The information layer 103 is composed of an incidence side protective film 106, an incidence side dielectric film 107, a recording film 108, a counter-incidence side dielectric film 109, a counter-incidence side protective film 110, a light absorption correction film 111, and a reflective film 112 that are arranged in this order from the laser beam incidence side.

The incidence side protective film 106 and the counter-incidence side protective film 110 have an optical function and a thermal function. For the optical function, an optical distance is adjusted so that light absorption efficiency with respect to the recording film 108 is increased, and thus a change in reflectance between a crystalline phase and an amorphous phase in the recording film 108 is increased, thereby allowing signal amplitude to be increased. For the thermal function, thermal insulation is provided between the recording film 108 that is heated to a high temperature in recording and each of the substrate 102 and the dummy substrate 105 that have low resistance to heat. A mixture of 80 mol % ZnS and 20 mol % $SiO_2$, which is used generally for the incidence side protective film 106 and the counter-incidence side protective film 110, is an excellent dielectric material that has a high light transmittance and refractive index, a low thermal conductivity, and good thermal insulation, and further is excellent in mechanical properties and moisture resistance.

As a material of the recording film 108, for example, a high-speed crystallization material containing Ge—Sn—Sb—Te can be used. Such a material can realize not only an initial recording/rewriting capability but also excellent archival characteristics and archival overwrite characteristics (characteristics that allow overwriting (rewriting) to be performed in an area in which information has been recorded for a long time).

The incidence side dielectric film 107 and the counter-incidence side dielectric film 109 have a function of preventing mass transfer from being caused between the incidence side protective film 106 and the recording film 108 and between the counter-incidence side protective film 110 and the recording film 108. The mass transfer is a phenomenon caused in the case where the mixture of 80 mol % ZnS and 20 mol % $SiO_2$ is used as a material for each of the incidence side protective film 106 and the counter-incidence side protective film 110. In the phenomenon, when recording/rewriting is performed repeatedly by irradiation of laser beams onto the recording film 108, S is diffused in the recording film 108. When S is diffused in the recording film 108, a repeated rewriting capability is deteriorated (N. Yamada et al. Japanese Journal of Applied Physics Vol. 37 (1998) pp. 2104–2110). In order to prevent this deterioration in the repeated rewriting capability, a nitride containing Ge should be used for the incidence side dielectric film 107 and the counter-incidence side dielectric film 109 as disclosed in International Publication No. WO97/34298 and JP10(1998)-275360 A.

The above-mentioned technology has allowed an excellent rewriting capability and high reliability to be achieved and led to the commercialization of the 4.7 GB/DVD-RAM.

Furthermore, in recent years, it has been demanded that optical information recording media be increased further in capacity, and various forms of technologies for achieving larger capacity have been studied. Specifically, such technologies include a technology for achieving high-density recording using a laser beam with a reduced spot diameter, which can be obtained by the use of a blue-violet laser beam having a wavelength shorter than that of a conventionally used red laser beam, or the use of a thinner substrate as a substrate arranged on the laser beam incidence side in combination with the use of an objective lens having a high numerical aperture (NA). In order to perform such recording using a laser beam with a reduced spot diameter, it is necessary to use an optical information recording medium that allows even a recording mark reduced in size to be formed into an excellent shape for the following reason. That is, when recording is performed using a laser beam with a reduced spot diameter, the laser beam is irradiated onto a recording film in relatively shorter time, and thus the crystallization ability of the recording film is deteriorated.

Furthermore, for the achievement of larger capacity, studies also have been made on a technology in which a recording capacity is doubled by using an optical information recording medium including two information layers, and with respect to these two information layers, recording/reproduction is performed by using a laser beam incident from a side of one face of the optical information recording medium (see, for example, JP12(2000)-36130 A). In the optical information recording medium that allows recording/reproduction to be performed with respect to the two information layers by using a laser beam incident from the side of the one side, the laser beam that has been transmitted through a first information layer arranged on a laser beam incidence side is used to perform recording/reproduction with respect to a second information layer arranged away from the laser beam incidence side. Therefore, it is required that a much thinner film be used as a recording film of the first information layer so that a higher light transmittance can be obtained. However, when the thinner film is used as the recording film, crystalline nuclei formed when a recording material is crystallized are reduced, and further, a distance in which atoms are allowed to move becomes shorter. Thus, the thinner the recording film is, the more the formation of a crystalline phase is hindered, thereby decreasing the crystallization speed.

As described above, for the realization of larger-capacity optical information recording media, it is important to improve the crystallization ability of the recording film. According to the test performed by the inventors of the present invention, it has been revealed that by the use of a recording material having a composition in which Sn is substituted for a part of Ge in a pseudobinary composition represented by a point on or near the composition line of GeTe—$Sb_2Te_3$, the crystallization speed of a recording film can be increased. However, as the amount of Sn as a substituent is increased, the change in optical property between a crystalline phase and an amorphous phase becomes small, thereby decreasing signal amplitude, which is disadvantageous.

As an effective measure for allowing the crystallization ability of the recording film to be increased without decreasing signal amplitude, a film having the effect of accelerating crystallization of the recording film is provided so as to be in contact with the recording film. According to the test performed by the inventors of the present invention, it has been revealed that by a configuration in which a dielectric film containing at least Cr, Zr and O is provided so as to be in contact with the recording film, the effect of accelerating crystallization can be enhanced.

However, as for this configuration in which the dielectric film is provided so as to be in contact with the recording film, it was confirmed that only insufficient adhesion between the recording film and the dielectric film could be achieved, and particularly, the dielectric film provided on a surface on a side opposite the laser beam incidence side with respect to the recording film exhibited poorer adhesion to the recording film than the dielectric film provided on a surface on the laser beam incidence side with respect to the recording film. Further, as for an optical information recording medium including a plurality of information layers, it was also confirmed that an information layer provided closest to the laser beam incidence side was formed so as to be thin for the achievement of a higher light transmittance, and thus water entry from the exterior was likely to be caused, thereby further decreasing adhesion between the dielectric film and the recording film. Thus, in the configuration in which the dielectric film having the effect of accelerating crystallization of the recording film is provided so as to be in contact with the recording film, reliability may be deteriorated due to insufficient adhesion between the dielectric film and the recording film, which has been disadvantageous.

SUMMARY OF THE INVENTION

A first optical information recording medium according to the present invention includes a substrate and an information layer. The information layer includes: a first dielectric film that contains Cr, O and at least one element (M1) selected from Zr and Hf; a recording film that is provided on the first dielectric film and changed in optical property reversibly by irradiation of laser beams; and a second dielectric film that is provided on the recording film and contains Cr, O and the at least one element (M1) selected from Zr and Hf, which are provided in this order from a side on which laser beams are incident. The first dielectric film has a Cr atom concentration of at least 6 at %, the second dielectric film has a Cr atom concentration of at least 9 at %, and the Cr atom concentration of the second dielectric film is larger than the Cr atom concentration of the first dielectric film.

A second optical information recording medium according to the present invention includes a substrate and an information layer. The information layer includes: a first dielectric film that contains Cr, Si, O and at least one element (M1) selected from Zr and Hf, a recording film that is provided on the first dielectric film and changed in optical property reversibly by irradiation of laser beams; and a second dielectric film that is provided on the recording film and contains Cr, Si, O and the at least one element (M1) selected from Zr and Hf, which are provided in this order from a side on which laser beams are incident. The first dielectric film has a Cr atom concentration of at least 6 at %, the second dielectric film has a Cr atom concentration of at least 9 at %, and a Si atom concentration of the second dielectric film is smaller than a Si atom concentration of the first dielectric film.

A first method for manufacturing an optical information recording medium according to the present invention is a method for manufacturing the first optical information recording medium according to the present invention. The method includes the steps of: forming the first dielectric film by sputtering using a first sputtering target containing at least Cr, O and the at least one element (M1) selected from Zr and Hf; forming the recording film that is changed in optical property reversibly by irradiation of laser beams; and forming the second dielectric film by sputtering using a second sputtering target containing at least Cr, O and the at least one element (M1) selected from Zr and Hf. A Cr atom concentration of the second sputtering target is larger than a Cr atom concentration of the first sputtering target.

A second method for manufacturing an optical information recording medium according to the present invention is a method for manufacturing the second optical information recording medium according to the present invention. The method includes the steps of: forming the first dielectric film by sputtering using a first sputtering target containing at least Si, Cr, O and the at least one element (M1) selected from Zr and Hf; forming the recording film that is changed in optical property reversibly by irradiation of laser beams; and forming the second dielectric film by sputtering using a second sputtering target containing at least Si, Cr, O and the at least one element (M1) selected from Zr and Hf. A Si atom concentration of the second sputtering target is smaller than a Si atom concentration of the first sputtering target.

DETAILED DESCRIPTION OF THE INVENTION

Figure 1:
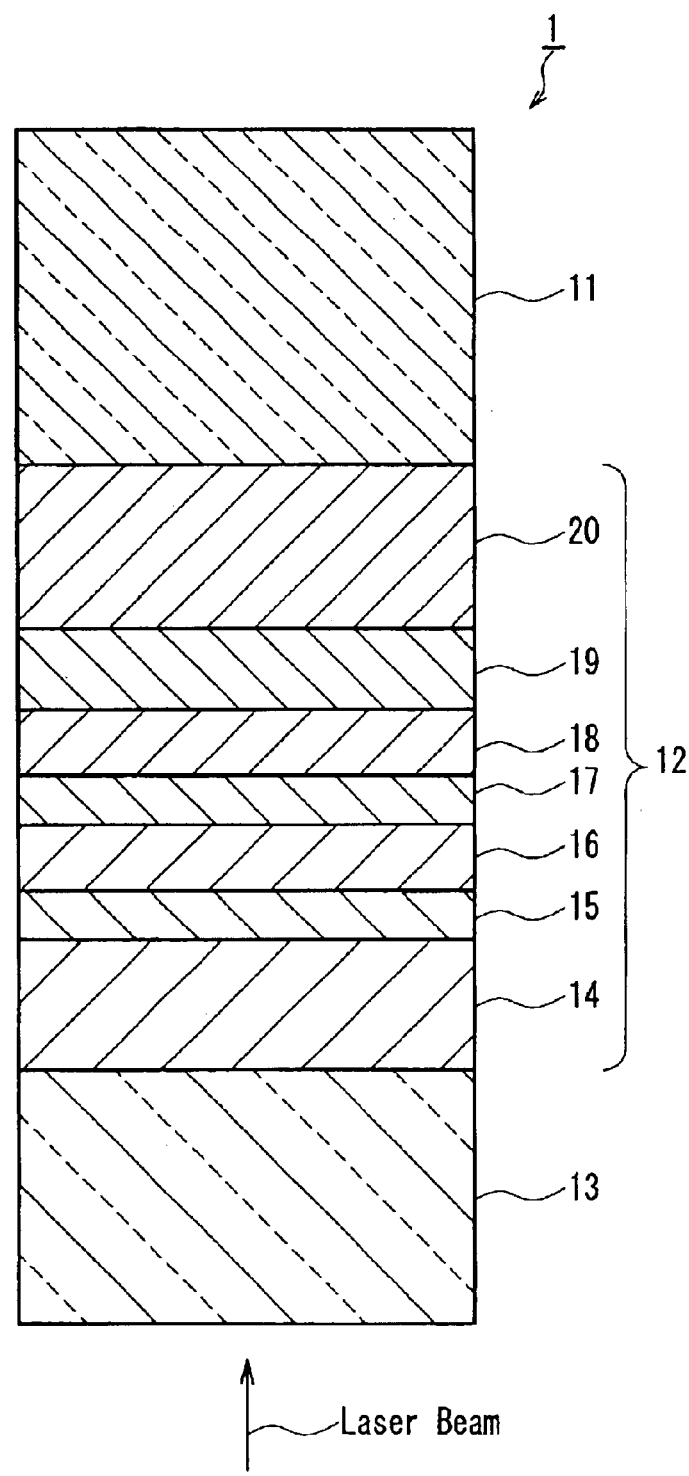
FIG. 1 is a cross sectional view showing a configuration of an optical information recording medium according to Embodiment 1 of the present invention.

According to the first optical information recording medium of the present invention, both adhesion between the first dielectric film and the recording film and adhesion between the second dielectric film and the recording film can be improved. Generally, the second dielectric film is more likely to peel off the recording film than the first dielectric film. In the present invention, a Cr atom concentration of the second dielectric film is made higher than a Cr atom concentration of the first dielectric film, and thus sufficient adhesion can be attained also between the second dielectric film and the recording film. This improvement in the adhesion between the first dielectric film and the recording film and between the second dielectric film and the recording film allows peeling to be prevented from being caused by water entry from the exterior, and thus an optical information recording medium having excellent reliability and moisture resistance can be obtained.

Furthermore, according to the first optical information recording medium of the present invention, an optical information recording medium can be provided that has excellent archival characteristics of attaining, for example, a difference of about not more than 2% between an initial jitter value and a jitter value obtained after long-term information storage, and excellent archival overwrite characteristics of attaining, for example, a difference of about not more than 2% between the initial jitter value and a jitter value obtained after overwriting new information on information that has been stored for a long time. In the first optical information recording medium, another type of film may be included between the respective films.

Preferably, in the first optical information recording medium according to the present invention, where the element M1, Cr and O that are contained in the first dielectric film are represented by a composition formula $Cr_{A1}(M1)_{B1}O_{(100-A1-B1)}$, A1 and B1 satisfy:

$6<A1<29$; and $9<B1<29$, respectively, and where the element M1, Cr and O that are contained in the second dielectric film are represented by a composition formula $Cr_{A2}(M1)_{B2}O_{(100-A2-B2)}$, A2 and B2 satisfy:

$11<A2<32$; and $6<B2<24$, respectively.

The first dielectric film and the second dielectric film are formed in this manner, and thus an optical information recording medium that achieves more excellent adhesion between the first dielectric film and the recording film and between the second dielectric film and the recording film, and further has an excellent recording/rewriting capability, can be obtained.

Preferably, the first optical information recording medium according to the present invention has the following configuration. That is, the first dielectric film contains a first mixture of $Cr_2O_3$ and $(M1)O_2$, and in the first mixture, $Cr_2O_3$ is contained in an amount of not less than 10 mol % and not more than 60 mol %. Further, the second dielectric film contains a second mixture of $Cr_2O_3$ and $(M1)O_2$, and in the second mixture, $Cr_2O_3$ is contained in an amount of not less than 20 mol % and not more than 80 mol %. Furthermore, the second mixture has a $Cr_2O_3$ concentration (mol %) higher than a $Cr_2O_3$ concentration (mol %) of the first mixture. The first dielectric film and the second dielectric film are formed in this manner, and thus an optical information recording medium that achieves more excellent adhesion between the first dielectric film and the recording film and between the second dielectric film and the recording film, and further has an excellent recording/rewriting capability, can be obtained.

Preferably, in the first optical information recording medium according to the present invention, a difference between the Cr atom concentration of the first dielectric film and the Cr atom concentration of the second dielectric film is not less than 3 at % and not more than 15 at %. According to this composition, an optical information recording medium that can suppress the occurrence of peeling and has excellent reliability can be obtained.

In the first optical information recording medium according to the present invention, the first dielectric film further may contain Si.

Preferably, in the first optical information recording medium according to the present invention, in the case where each of the first dielectric film and the second dielectric film contains an element other than the element (M1), Cr and O, the element is contained in an amount of not more than 1 at %.

According to the second optical information recording medium of the present invention, both adhesion between the first dielectric film and the recording film and adhesion between the second dielectric film and the recording film can be improved. Generally, the second dielectric film is more likely to peel off the recording film than the first dielectric film. In the present invention, a Si atom concentration of the second dielectric film is made lower than a Si atom concentration of the first dielectric film, and thus sufficient adhesion can be attained also between the second dielectric film and the recording film. This improvement in the adhesion between the first dielectric film and the recording film and between the second dielectric film and the recording film allows peeling to be prevented from being caused by water entry from the exterior, and thus an optical information recording medium having excellent reliability and moisture resistance can be obtained.

Furthermore, according to the second optical information recording medium of the present invention, an optical information recording medium can be provided that has excellent archival characteristics of attaining, for example, a difference of about not more than 2% between an initial jitter value and a jitter value obtained after long-term information storage, and excellent archival overwrite characteristics of attaining, for example, a difference of about not more than 2% between the initial jitter value and a jitter value obtained after overwriting new information on information that has been stored for a long time. In the second optical information recording medium, another type of film may be included between the respective films.

Preferably, in the second optical information recording medium according to the present invention, the Cr atom concentration of the second dielectric film is made higher than the Cr atom concentration of the first dielectric film. The reason for this is that by this composition, adhesion of the second dielectric film that is likely to peel off the recording film further can be improved.

Preferably, in the second optical information recording medium according to the present invention, where the element M1, Cr, Si and O that are contained in the first dielectric film are represented by a composition formula $Si_{C3}Cr_{A3}M1_{B3}O_{(100-A3-B3-C3)}$, A3, B3 and C3 satisfy:

$6<A3<32$;

$1<B3$; and $1<C3<13$, respectively, and where the element M1, Cr, Si and O that are contained in the second dielectric film are represented by a composition formula $Si_{C4}Cr_{A4}M1_{B4}O_{(100-A4-B4-C4)}$, A4, B4 and C4 satisfy:

$11<A4<35$;

$1<B4$; and $0<C4<11$, respectively.

Preferably, $A3<A4$ further is satisfied. The first dielectric film and the second dielectric film are formed in this manner, and thus an optical information recording medium that achieves more excellent adhesion between the first dielectric film and the recording film and between the second dielectric film and the recording film, and further has an excellent recording/rewriting capability, can be obtained.

Preferably, the second optical information recording medium according to the present invention has the following configuration. That is, the first dielectric film contains a first mixture of $SiO_2$, $Cr_2O_3$ and $(M1)O_2$. In the first mixture, $SiO_2$ is contained in an amount of not less than 5 mol % and not more than 40 mol %, $Cr_2O_3$ is contained in an amount of not less than 10 mol % and not more than 70 mol %, and $SiO_2+Cr_2O_3$ is contained in an amount of not less than 15 mol % and not more than 95 mol %. Further, the second dielectric film contains a second mixture of $SiO_2$, $Cr_2O_3$ and $(M1)O_2$. In the second mixture, $SiO_2$ is contained in an amount of not more than 35 mol %, $Cr_2O_3$ is contained in an amount of not less than 20 mol % and not more than 80 mol %, and $SiO_2+Cr_2O_3$ is contained in an amount of more than 20 mol % and not more than 95 mol %. Furthermore, the second dielectric film has a $SiO_2$ concentration (mol %) lower than a $SiO_2$ concentration (mol %) of the first dielectric film. Moreover, preferably, the second mixture has a $Cr_2O_3$ concentration (mol %) higher than a $Cr_2O_3$ concentration (mol %) of the first mixture. The first dielectric film and the second dielectric film are formed in this manner, and thus an optical information recording medium that achieves more excellent adhesion between the first dielectric film and the recording film and between the second dielectric films and the recording film, and further has an excellent recording/rewriting capability, can be obtained.

Preferably, in the second optical information recording medium according to the present invention, a difference between the Si atom concentration of the first dielectric film and the Si atom concentration of the second dielectric film is not less than 1 at % and not more than 10 at %. According to this composition, an optical information recording medium that can suppress the occurrence of peeling and has excellent reliability can be obtained.

Preferably, in the second optical information recording medium according to the present invention, in the case where each of the first dielectric film and the second dielectric film contains an element other than the element (M1), Cr, Si and O, the element is contained in an amount of not more than 1 at %.

In each of the first and second optical information recording media according to the present invention, a plurality of the information layers also can be provided. This allows a large-capacity optical information recording medium having high reliability and an excellent recording/rewriting capability to be obtained.

Preferably, in each of the first and second optical information recording media according to the present invention, the recording film contains Ge, Te and at least one element (M2) selected from Sb and Bi, and where the element M2, Ge and Te are represented by a composition formula $Ge_a(M2)_bTe_{3+a}$, $0<a \leq 60$, and $1.5 \leq b \leq 7$ are satisfied.

The reason for this is that by this composition, even when a thin film having a thickness of about not more than 12 nm is used as the recording film, an excellent recording/reproduction capability can be obtained.

Preferably, in each of the first and second optical information recording media according to the present invention, in the composition formula $Ge_a(M2)_bTe_{3+a}$, at least a part of Ge is substituted by at least one element (M3) selected from Sn and Pb. The reason for this is that by this composition, the M3 substituted for Ge in a tertiary composition of Ge-M2-Te improves the crystallization ability. Thus, even when an extremely thin film having a thickness of about not more than 7 nm is used as the recording film, a sufficient rewriting capability can be obtained.

Preferably, in each of the first and second optical information recording media according to the present invention, the recording film contains Ge, Te, at least one element (M2) selected from Sb and Bi, and at least one element (M4) selected from the group consisting of Si, Ti, V, Cr, Mn, Fe, Co, Ni, Cu, Se, Zr, Nb, Mo, Ru, Rh, Pd, Ag, In, Sn, Ta, W, Os, Ir, Pt, Gd, Tb, Dy and Au. Where the elements M2 and M4, are represented by a composition formula $(Ge_a(M2)_bTe_{3+a})_{100-c}(M4)_c$, $0<a \leq 60$, $1.5 \leq b \leq 7$, and $0<c \leq 20$ are satisfied.

The reason for this is that by this composition, the element M4 added to the tertiary composition of Ge-M2-Te increases a melting point and a crystallization temperature of the recording film, and thus thermal stability of the recording film can be improved.

Preferably, in each of the first and second optical information recording media according to the present invention, the recording film contains Sb, Te, and one element (M5) selected from a group consisting of Ag, In, Ge, Sn, Se, Bi, Au and Mn. Where Sb, Te, and the element M5 are represented by a composition formula $(Sb_dTe_{100-d})_{100-e}(M5)_e$, $50 \leq d \leq 95$, and $0 < e \leq 20$ are satisfied.

The reason for this is that the recording film having this composition has a melting point that is relatively low, and thus even with a laser power that is relatively low, an excellent recording property can be obtained.

Preferably, each of the first and second optical information recording media according to the present invention has the following configuration. That is, the information layer further includes a protective film provided so as to be in contact with the first dielectric film on a side of the first dielectric film on which laser beams are incident. The protective film may contain at least one selected from the group consisting of $TiO_2$, $ZrO_2$, $HfO_2$, ZnO, $Nb_2O_5$, $Ta_2O_5$, $SiO_2$, $Al_2O_3$, $Bi_2O_3$, C—N, Ti—N, Zr—N, Nb—N, Ta—N, Si—N, Ge—N, Cr—N, Al—N, Ge—Si—N, Ge—Cr—N, ZnS, and SiC. The reason for this is that by this configuration, oxidation, corrosion, deformation and the like of the recording film can be prevented.

Preferably, each of the first and second optical information recording media according to the present invention has the following configuration. That is, the information layer further contains a reflective film provided on a side of the second dielectric film opposite a side on which laser beams are incident. The reflective film may contain at least one element selected from Ag, Au, Cu and Al. The reason for this is that by this configuration, an amount of light absorbed in the recording film can be increased, and heat generated in the recording film can be diffused.

Preferably, each of the first and second optical information recording media according to the present invention has the following configuration. That is, the information layer further includes a transmittance adjusting film provided so as to be in contact with the reflective film on a side of the reflective film opposite a side on which laser beams are incident. The transmittance adjusting film may contain at least one selected from the group consisting of $TiO_2$, $ZrO_2$, $HfO_2$, ZnO, $Nb_2O_5$, $Ta_2O_5$, $SiO_2$, $Al_2O_3$, $Bi_2O_3$, Ti—N, Zr—N, Nb—N, Ta—N, Si—N, Ge—N, Cr—N, Al—N, Ge—Si—N, Ge—Cr—N, and ZnS. In the case where a plurality of the information layers are provided, it is required that a laser beam reach even the information layer arranged away from a surface on a side on which laser beams are incident. In such a case, this configuration is particularly effective in that the transmittance of the information layer can be increased.

Each of the first and second optical information recording media according to the present invention may include another information layer having a film configuration different from that of the information layer. In this case, preferably, the information layer (first information layer) arranged closest to the surface on the side on which laser beams are incident has a film configuration according to the present invention. The reason for this is that in an optical information recording medium with a multi-layer structure, the recording film included in the first information layer is formed of a thin film so that a high transmittance can be obtained, and thus the first information layer is required to achieve a high crystallization ability and high reliability even with the thin recording film.

A first method for manufacturing an optical information recording medium of the present invention allows manufacturing of an optical information recording medium that achieves excellent adhesion between the first dielectric film and the recording film and between the second dielectric film and the recording film, and has high reliability.

In the first method for manufacturing an optical information recording medium according to the present invention, where the element M1, Cr and O that are contained in the first sputtering target are represented by a composition formula $Cr_{D1}M1_{E1}O_{100-D1-E1}$, D1 and E1 satisfy:

$3 < D1 < 29$; and $9 < E1 < 31$, and where the element M1, Cr and O that are contained in the second sputtering target are represented by a composition formula $Cr_{D2}M1_{E2}O_{100-D2-E2}$, D2 and E2 satisfy:

$9 < D2 < 32$; and $6 < E2 < 26$.

The reason for this is that this allows manufacturing of an optical information recording medium that achieves more excellent adhesion between the first dielectric film and the recording film and between the second dielectric film and the recording film, and also has an excellent recording/rewriting capability.

Preferably, in the first method for manufacturing an optical information recording medium according to the present invention, the following is achieved. That is, the first sputtering target contains a first mixture of $Cr_2O_3$ and $(M1)O_2$, and in the first mixture, $Cr_2O_3$ is contained in an amount of not less than 5 mol % and not more than 60 mol %. Further, the second sputtering target contains a second mixture of $Cr_2O_3$ and $(M1)O_2$, and in the second mixture, $Cr_2O_3$ is contained in an amount of not less than 15 mol % and not more than 80 mol %. Furthermore, the second mixture has a $Cr_2O_3$ concentration (mol %) higher than a $Cr_2O_3$ concentration (mol %) of the first mixture. The reason for this is that this allows manufacturing of an optical information recording medium that achieves more excellent adhesion between the first dielectric film and the recording film and between the second dielectric film and the recording film, and also has an excellent recording/rewriting capability.

Furthermore, a second method for manufacturing an optical information recording medium of the present invention allows manufacturing of a highly reliable optical information recording medium that achieves excellent adhesion between the first dielectric film and the recording film and between the second dielectric film and the recording film.

Preferably, in the second method for manufacturing an optical information recording medium according to the present invention, the second sputtering target has a Cr atom concentration higher than a Cr atom concentration of the first sputtering target. The reason for this is that this allows manufacturing of an optical information recording medium that achieves more excellent adhesion between the second dielectric film and the recording film.

Preferably, in the second method for manufacturing an optical information recording medium according to the present invention, where the element M1, Si, Cr and O that are contained in the first sputtering target are represented by a composition formula $Si_{F3}Cr_{D3}M1_{E3}O_{100-D3-E3-F3}$, D3, E3 and F3 satisfy:

$3 < D3 < 32$;

$1 < E3$; and $1 < F3 < 13$, and where the element M1, Si, Cr and O that are contained in the second sputtering target are represented by a composition formula $Si_{F4}Cr_{D4}M1_{E4}O_{100-D4-E4-F4}$, D4, E4 and F4 satisfy:

9<D4<35;

1<E4; and

1<F4<11.

The reason for this is that this allows manufacturing of an optical information recording medium that achieves more excellent adhesion between the first dielectric film and the recording film and between the second dielectric film and the recording film, and also has an excellent recording/rewriting capability.

Preferably, in the second method for manufacturing an optical information recording medium according to the present invention, the following is achieved. That is, the first sputtering target contains a first mixture of $SiO_2$, $Cr_2O_3$ and $(M1)O_2$. In the first mixture, $SiO_2$ is contained in an amount of not less than 5 mol % and not more than 40 mol %, $Cr_2O_3$ is contained in an amount of not less than 5 mol % and not more than 70 mol %, and $SiO_2+Cr_2O_3$ is contained in an amount of not less than 10 mol % and not more than 95 mol %. Further, the second sputtering target contains a second mixture of $SiO_2$, $Cr_2O_3$ and $(M1)O_2$. In the second mixture, $SiO_2$ is contained in an amount of not more than 35 mol %, $Cr_2O_3$ is contained in an amount of not less than 15 mol % and not more than 80 mol %, and $SiO_2+Cr_2O_3$ is contained in an amount of more than 10 mol % and not more than 95 mol %. Furthermore, the second mixture has a $SiO_2$ concentration (mol %) lower than a $SiO_2$ concentration (mol %) of the first mixture. The reason for this is that this allows manufacturing of an optical information recording medium that achieves more excellent adhesion between the first dielectric film and the recording film and between the second dielectric film and the recording film, and also has an excellent recording/rewriting capability.

Furthermore, when manufacturing an optical information recording medium with a multi-layer structure including a plurality of the information layers, it also is possible to use the first or second method for manufacturing an optical information recording medium according to the present invention to form at least one of the plurality of information layers.

Hereinafter, the present invention will be described by way of embodiments with reference to the appended drawings.

Embodiment 1

The description is directed to an embodiment of an optical information recording medium according to the present invention. FIG. 1 is a cross sectional view showing a configuration of an optical information recording medium 1 according to this embodiment. The optical information recording medium 1 allows information recording/reproduction to be performed with respect thereto by irradiation of laser beams.

In the optical information recording medium 1, an information layer 12 is provided on a substrate 11, and a transparent layer 13 further is provided on the information layer 12. Laser beams are irradiated onto this optical information recording medium 1 from a side of the transparent layer 13. The information layer 12 is formed in the following manner. That is, in the information layer 12, an incidence side protective film 14, an incidence side dielectric film (first dielectric film) 15, a recording film 16, a counter-incidence side dielectric film (second dielectric film) 17, a counter-incidence side protective film 18, a metallic film 19, and a reflective film 20 are laminated in this order from a laser beam irradiation side. With regard to the names of the dielectric films and the protective films, the incidence side film refers to a film arranged on a laser beam incidence side with respect to the recording film 16, and the counter-incidence side film refers to a film arranged on a side opposite the laser beam incidence side with respect to the recording film 16.

Preferably, the transparent layer 13 is made of, for example, a resin such as a photocurable resin (particularly, an ultraviolet curable resin), a delayed action type thermosetting resin or the like, or a dielectric, and has a low light absorptance with respect to a laser beam to be used. Further, preferably, the transparent layer 13 has a low birefringence at a wavelength in a short wavelength region. Further, the transparent layer 13 may be formed of a disk-shaped transparent layer made of a resin such as polycarbonate, amorphous polyolefin, PMMA (polymethyl methacrylate) or the like, or glass. When using any of these materials, the transparent layer 13 is formed in the following manner. That is, the transparent layer 13 is laminated to the information layer 12 with a photocurable resin (particularly, an ultraviolet curable resin), a delayed action type thermosetting resin or the like.

The substrate 11 is a disk-shaped transparent substrate. The substrate 11 can be made of, for example, a resin such as polycarbonate, amorphous polyolefin, PMMA or the like, or glass. Most preferably, polycarbonate is used since it exhibits an excellent transfer property and suitability for mass production and achieves a cost reduction. When necessary, guide grooves for guiding laser beams may be formed on a surface of the substrate 11 that is in contact with the information layer 12. Preferably, a surface of the substrate 11 on a side opposite the surface that is in contact with the information layer 12 is made smooth.

Preferably, the substrate 11 has a thickness in a range of 500 µm to 1,200 µm so as to have a sufficient strength and allow the optical information recording medium 1 as a whole to have a thickness of about 1,200 µm. When the transparent layer 13 has a thickness of about 600 µm (where NA=0.6, this thickness allows excellent recording/reproduction to be performed), preferably, the substrate 11 has a thickness in a range of 550 µm to 650 µm. Further, when the transparent layer 13 has a thickness of about 100 µm (where NA=0.85, this thickness allows excellent recording/reproduction to be performed), preferably, the substrate 11 has a thickness in a range of 1,050 µm to 1,150 µm.

When focusing a laser beam, a beam spot thus obtained has a diameter determined by a wavelength λ of the laser beam, and the shorter the wavelength λ, the more the beam spot can be reduced in diameter. Thus, preferably, in high-density recording, the laser beam has a wavelength λ of not more than 450 nm. Further, when the wavelength λ has a value less than 350 nm, light absorption by the transparent layer 13 or the like is increased. Thus, preferably, the laser beam has a wavelength λ of not less than 350 nm.

The description is directed next to each of the films constituting the information layer 12.

The incidence side protective film 14 may be formed of a dielectric. The incidence side protective film 14 has a function of preventing oxidation, corrosion, deformation and the like of the recording film 16, a function of increasing the light absorption efficiency of the recording film 16 by adjusting an optical distance, and a function of increasing signal amplitude by increasing a change in an amount of reflected light between before and after recording. The incidence side protective film 14 can be made of, for example, an oxide such as $TiO_2$, $ZrO_2$, $HfO_2$, ZnO, $Nb_2O_2$, $Ta_2O_5$, $SiO_2$, $Al_2O_3$, or $Bi_2O_3$. Further, the incidence side protective film 14 also can be made of a nitride such as C—N, Ti—N, Zr—N, Nb—N, Ta—N, Si—N, Ge—N, Cr—N, Al—N, Ge—Si—N, Ge—Cr—N or the like. Further, a sulfide such as ZnS or the like and a carbide such as SiC or the like also can be used. Further, a mixture of the above-mentioned materials also can be used. For example, a mixture of ZnS and $SiO_2$, i.e., (ZnS—$SiO_2$) is a particularly excellent material to be used for the incidence side protective film 14. The mixture ZnS—$SiO_2$ is an amorphous material that has a high refractive index and a high film-forming speed, and is excellent in mechanical properties and moisture resistance.

By calculation based on a matrix method (see, for example, "Wave Optics" by Hiroshi Kubota, published by Iwanami Shoten, 1971, Chapter 3), the thickness of the incidence side protective film 14 can be determined so that a change in an amount of reflected light between when the recording film 16 is in a crystalline phase and when the recording film 16 is in an amorphous phase can be increased, and light absorption in the recording film 16 can be increased.

The incidence side dielectric film 15 has a function of preventing mass transfer caused between the incidence side protective film 14 and the recording film 16 by repeated recording, and a function of accelerating crystallization of the recording film 16. The incidence side dielectric film 15 is provided so as to be in contact with the recording film 16. Therefore, preferably, the incidence side dielectric film 15 is formed of a material that has such a high melting point as not to allow the incidence side dielectric film 15 to melt in recording, and exhibits excellent adhesion to the recording film 16. In order to prevent the material of the incidence side dielectric film 15 from melting so as to be mixed into the recording film 16 under irradiation of high-power laser beams, the material is required to have this property of having such a high melting point as not to allow melting to be caused in recording. This is because when a substance constituting the incidence side dielectric film 15 is mixed into the recording film 16, the composition of the recording film 16 is changed, thereby substantially deteriorating the rewriting capability. Further, in order to secure reliability, the material is required to have this property of exhibiting excellent adhesion to the recording film 16 formed of a chalcogenide-based material.

The incidence side dielectric film 15 is formed of a material containing Cr, O and at least one element (M1) selected from Zr and Hf Preferably, among such materials, a mixture of $Cr_2O_3$ and $(M1)O_2$ (first mixture) is used, in which a compound $Cr_2O_3$ is formed from Cr and O and a compound $(M1)O_2$ is formed from the element M1 and O. The compound $Cr_2O_3$ is a material exhibiting excellent adhesion to the recording film 16. Further, the compounds $ZrO_2$ and $HfO_2$ are transparent materials each having a melting point as high as 2,700 to 2,800° C. and a thermal conductivity that is low compared with other oxides, thereby contributing to an improvement in repeated rewriting capability. The incidence side dielectric film 15 contains the mixture of these two types of oxides, thereby allowing an optical information recording medium having an excellent repeated rewriting capability and high reliability to be realized. Preferably, in order to secure adhesion to the recording film 16, in the mixture $Cr_2O_3$-$(M1)O_2$, $Cr_2O_3$ is contained in an amount of not less than 10 mol %. Further, when $Cr_2O_3$ is contained in an increased amount, light absorption tends to be increased. Thus, preferably, in order to maintain a low level of light absorption in the incidence side dielectric film 15, $Cr_2O_3$ is contained in an amount of not more than 60 mol %. More preferably, $Cr_2O_3$ is contained in an amount of not less than 20 mol % and not more than 50 mol %.

The incidence side dielectric film 15 also can be formed of a material further containing Si in addition to the element M1, Cr and O. Preferably, among such materials, a mixture of $SiO_2$, $Cr_2O_3$ and $(M1)O_2$ (first mixture) is used, in which a compound $Cr_2O_3$ is formed from Cr and O, a compound $(M1)O_2$ is formed from the element M1 and O, and a compound $SiO_2$ is formed from Si and O. The compound $SiO_2$ is contained, and thus the effect of accelerating crystallization of the recording film 16 is enhanced, thereby allowing an optical information recording medium having an excellent rewriting capability to be realized. Preferably, in the mixture $SiO_2$—$Cr_2O_3$-$(M1)O_2$, $SiO_2$ is contained in an amount of not less than 5 mol %, and preferably, in order to secure adhesion to the recording film 16, $SiO_2$ is contained in an amount of not more than 40 mol %. More preferably, $SiO_2$ is contained in an amount of not less than 10 mol % and not more than 35 mol %. Further, preferably, in the mixture $SiO_2$—$Cr_2O_3$-$(M1)O_2$, $Cr_2O_3$ is contained in an amount of not less than 10 mol % and not more than 70 mol %. Further, preferably, in order to secure an excellent recording/rewriting capability, $SiO_2$ and $Cr_2O_3$ are contained in a total amount of not more than 95 mol %.

In order to prevent a change in an amount of reflected light between before and after recording with respect to the optical information recording medium 1 from being decreased by light absorption in the incidence side dielectric film 15, the incidence side dielectric film 15 has a thickness, desirably, in a range of 1 nm to 10 nm, and more preferably, in a range of 2 nm to 5 nm.

The counter-incidence side dielectric film 17 has the same functions as those of the incidence side dielectric film 15, which are a function of preventing mass transfer from being caused between the counter-incidence side protective film 18 and the recording film 16 by repeated recording and a function of accelerating crystallization of the recording film 16. The counter-incidence side dielectric film 17 further has a function of increasing light absorption efficiency of the recording film 16 by adjusting an optical distance and a function of increasing signal amplitude by increasing a change in an amount of reflected light between before and after recording. Preferably, as in the case of the incidence side dielectric film 15, the counter-incidence side dielectric film 17 is formed of a material containing the element M1, Cr and O. Preferably, among such materials, a mixture of $Cr_2O_3$ and $(M1)O_2$ (second mixture) is used, in which a compound $Cr_2O_3$ is formed from Cr and O and a compound $(M1)O_2$ is formed from the element M1 and O. The counter-incidence side dielectric film 17 is more likely to peel off the recording film 16 than the incidence side dielectric film 15. Therefore, it is required that the Cr atom concentration of the counter-incidence side dielectric film 17 be increased versus that of the incidence side dielectric film 15 so that adhesion to the recording film 16 can be improved. Thus, for example, in the case where the counter-incidence side dielectric film 17 contains the mixture $Cr_2O_3$-$(M1)O_2$, in the mixture $Cr_2O_3$-$(M1)O_2$, $Cr_2O_3$ is contained, preferably, in an amount of not less than 20 mol % and not more than 80 mol %, which is larger than an amount of $Cr_2O_3$ contained in the incidence side dielectric film 15, and more preferably, in an amount of not less than 30 mol % and not more than 70 mol %. This is based on the following reason. That is, the counter-incidence side dielectric film 17, which is more likely to allow water entry than the incidence side dielectric film 15, is more likely to peel off the recording film 16 than the incidence side dielectric film 15. Thus, the content of $Cr_2O_3$ exhibiting excellent adhesion to the recording film 16 is increased so that adhesion can be improved.

As in the case of the incidence side dielectric film 15, the counter-incidence side dielectric film 17 may be formed of a material further containing Si in addition to the element M1, Cr and O. Preferably, among such materials, a mixture of $SiO_2$, $Cr_2O_3$ and $(M1)O_2$ (second mixture) is used, in which a compound $Cr_2O_3$ is formed from Cr and O, a compound $(M1)O_2$ is formed from the element M1 and O, and a compound $SiO_2$ is formed from Si and O. In order to improve adhesion to the recording film 16, in the mixture $SiO_2$—$Cr_2O_3$-$(M1)O_2$, $SiO_2$ is contained, preferably, in an amount of not more than 35 mol %, which is less than an amount of $SiO_2$ contained in the incidence side dielectric film 15, and more preferably, in an amount of not less than 5 mol % and not more than 30 mol %. Further, preferably, in the mixture $SiO_2$—$Cr_2O_3$—$ZrO_2$, $Cr_2O_3$ is contained in an amount of not less than 20 mol % and not more than 80 mol %. Further, in order to secure an excellent recording/rewriting capability, preferably, $SiO_2$ and $Cr_2O_3$ are contained in a total amount of not more than 95 mol %.

The counter-incidence side dielectric film 17 has a thickness of, preferably, 2 nm to 75 nm, and more preferably, 2 nm to 40 nm. The counter-incidence side dielectric film 17 is formed so as to have a thickness in this range, heat generated in the recording film 16 can be diffused effectively to a side of the reflective film 20.

The counter-incidence side protective film 18 can be made of a material in the same system as a material of the incidence side protective film 14. The mixture $ZnS$—$SiO_2$ also can be used as an excellent material of the counter-incidence side protective film 18.

The counter-incidence side protective film 18 has a thickness of, preferably, 2 nm to 75 nm, and more preferably, 2 nm to 40 nm. The counter-incidence side protective film 18 is formed so as to have a thickness in this range, and thus heat generated in the recording film 16 can be diffused effectively to the side of the reflective film 20. A configuration without the counter-incidence side protective film 18 also is possible.

The recording film 16 is formed of a material that allows a phase change between a crystalline phase and an amorphous phase to be caused reversibly by irradiation of laser beams. For example, the recording film 16 can be formed of a material containing Ge-M2-Te. Herein, the element M2 is at least one element selected from Sb and Bi. Specifically, the recording film 16 can be formed of, for example, a material represented by a composition formula $Ge_a(M2)_bTe_{3+a}$. By using such a material, it is possible to form a recording film that achieves stability in an amorphous phase and a large signal amplitude, and can suppress an increase in melting point and a decrease in crystallization speed. In the material represented by the composition formula $Ge_a(M2)_bTe_{3+a}$, desirably, $0<a \leq 60$ is satisfied, and more preferably, $4 \leq a \leq 23$ is satisfied. Further, in order to achieve stability in an amorphous phase and a large signal amplitude and to suppress a decrease in crystallization speed, preferably, $1.5 \leq b \leq 7$ is satisfied, and more preferably, $1.5 \leq b \leq 3$ is satisfied.

Further, the recording film 16 may be formed of a material in which at least one element (M3) selected from Sn and Pb is substituted for a part of Ge in $Ge_a(M2)_bTe_{3+a}$. When using such a material, the element M3 substituted for Ge enhances the crystallization ability, and thus a sufficient erasing rate can be attained even when a thin film is used as the recording film 16. More preferably, Sn is used as the element M3 since Sn possesses no toxicity. In this case, preferably, $0<a \leq 60$ (more preferably, $4 \leq a \leq 23$) and $1.5 \leq b \leq 7$ (more preferably, $1.5 \leq b \leq 3$) also are satisfied. When used for the recording film 16, a material having this composition is particularly effective with respect to recording/reproduction performed at a high linear velocity (6 m/s to 10 m/s).

Furthermore, the recording film 16 also may be formed of a material represented by a composition formula $(Ge_aM2_bTe_{3+a})_{100-c}M4_c$ (M4 is at least one element selected from the group consisting of Si, Ti, V, Cr, Mn, Fe, Co, Ni, Cu, Se, Zr, Nb, Mo, Ru, Rh, Pd, Ag, In, Sn, Ta, W, Os, Ir, Pt, Gd, Tb, Dy and Au). In this case, the added element M4 causes the melting point and crystallization temperature of the recording film to be increased, and thus thermal stability of the recording film 16 is enhanced. In such a material, preferably, $0<c \leq 20$ is satisfied, and more preferably, $2 \leq c \leq 10$ is satisfied. Furthermore, preferably, $0<a \leq 60$ (more preferably, $4 \leq a<23$) and $1.5 \leq b \leq 7$ (more preferably, $1.5 \leq b \leq 3$) are satisfied. When used for the recording film 16, a material having this composition is particularly effective with respect to recording/reproduction performed at a low linear velocity (3 m/s to 4 m/s).

Furthermore, the recording film 16 also may be formed of a material represented by a composition formula $(Sb_dTe_{100-d})_{100-e}(M5)_e$ (M5 is at least one element selected from the group consisting of Ag, In, Ge, Sn, Se, Bi, Au, and Mn). When $50 \leq d \leq 95$ and $0<e \leq 20$ are satisfied, it is possible to increase a difference in reflectance of the optical information recording medium 1 between when the recording film 16 is in a crystalline phase and when the recording film 16 is in an amorphous phase, and thus an excellent recording/reproduction property can be obtained. When $65 \leq d$ is satisfied, the crystallization speed can be increased particularly, thereby allowing the erasing rate to be improved particularly. Furthermore, when $80 \leq d$ is satisfied, it becomes difficult to cause a phase change to the amorphous phase. Thus, more preferably, $65<d \leq 85$ is satisfied. Furthermore, in order to obtain an excellent recording/reproduction capability, preferably, the element M5 used for adjusting the crystallization speed is added. More preferably, $1 \leq e \leq 10$ is satisfied. When $e \leq 10$ is satisfied, the emergence of a plurality of phases can be suppressed, and thus a deterioration in properties due to repeated recording can be suppressed.

Preferably, in order to increase recording sensitivity, the recording film 16 has a thickness in a range of 6 nm to 15 nm. Even when this range is satisfied, in the case where a too thick film is used as the recording film 16, heat diffusion to an in-plane direction causes neighboring regions to be affected thermally to a greater degree. Further, in the case where a too thin film is used as the recording film 16, a reflectance of the optical information recording medium 1 is decreased. Thus, more preferably, the recording film 16 has a thickness in a range of 8 nm to 12 nm.

The reflective film 20 has an optical function of increasing an amount of light to be absorbed by the recording film 16. Further, the reflective film 20 also has a thermal function of allowing heat generated in the recording film 16 to be diffused smoothly, thereby allowing the recording film 16 to be changed in phase to the amorphous phase more easily. Moreover, the reflective film 20 also has a function of protecting a multi-layer film from an environment of use.

The reflective film 20 can be made of a single metal having a high thermal conductivity such as Ag, Au, Cu and Al or an alloy such as Al—Cr, Al—Ti, Au—Pd, Au—Cr, Ag—Pd, Ag—Pd—Cu, Ag—Pd—Ti, Ag—Ru—Au, Ag—Nd—Au, Ag—Nd—Cu, or Cu—Si. Particularly, an Ag alloy has a high thermal conductivity, and thus preferably is used as a material of the reflective film 20. Preferably, the reflective film 20 has a thickness of not less than 30 nm, which is such a thickness as to allow a heat diffusing function to be performed sufficiently. Even when this range of film thickness is satisfied, in the case where the reflective film 20 has a thickness more than 200 nm, the heat diffusing function is enhanced excessively, thereby decreasing recording sensitivity of the optical information recording medium 1. Thus, preferably, the reflective film 20 has a thickness in a range of 30 nm to 200 nm.

The metal film 19 may be arranged on an interface of the reflective film 20 on the laser beam incidence side. In this case, the metal film 19 can be made of a material having a thermal conductivity lower than that of the material described with regard to the reflective film 20. Preferably, when the reflective film 20 is made of an Ag alloy, Al or an Al alloy is used for the metal film 19. Further, the metal film 19 has a thickness of, preferably, 3 nm to 100 nm, and more preferably, 10 nm to 50 nm.

According to the optical information recording medium 1 having the above-mentioned configuration, excellent adhesion between the recording film 16 and each of the incidence side and counter-incidence side dielectric films 15 and 17 can be attained, thereby achieving high reliability, and an excellent rewriting capability can be obtained. Further, the crystallization ability of the recording film 16 is improved, thereby allowing larger capacity to be realized.

Embodiment 2

Figure 2:
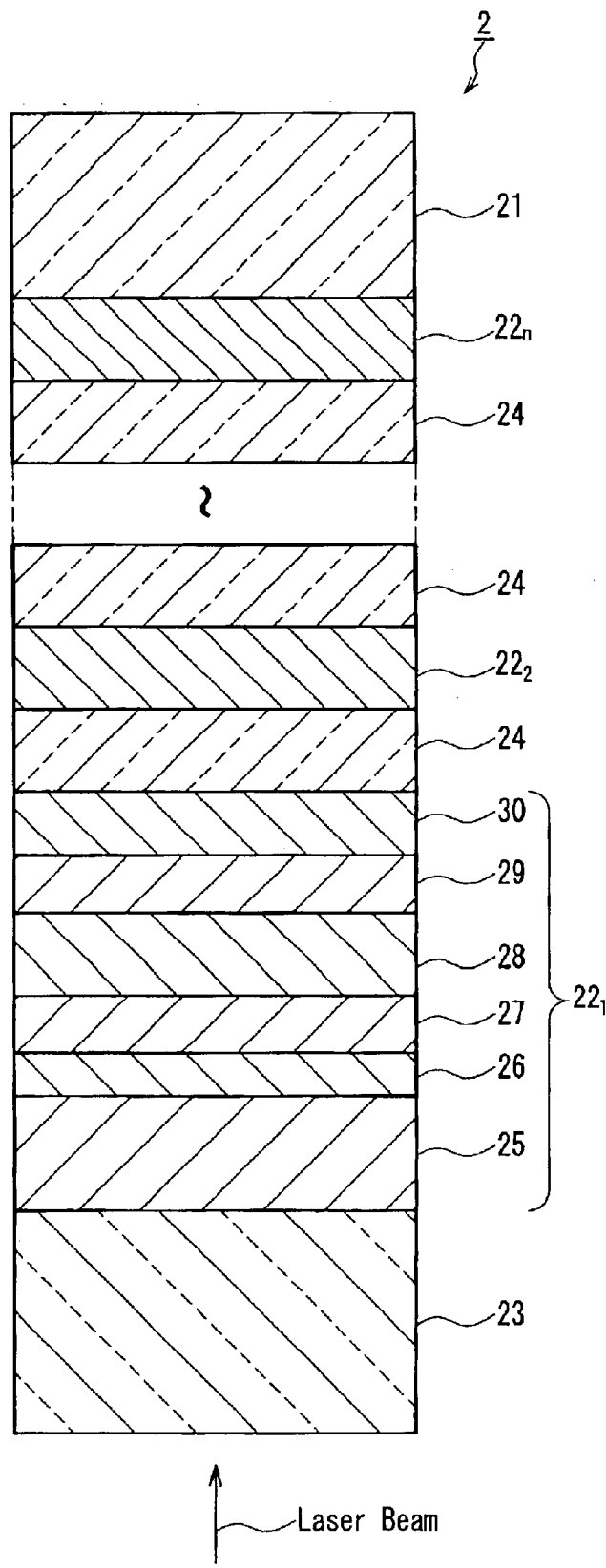
FIG. 2 is a cross sectional view showing a configuration of an optical information recording medium according to Embodiment 2 of the present invention.

The description is directed to another embodiment of the optical information recording medium according to the present invention. FIG. 2 is a cross sectional view showing a configuration of an optical information recording medium 2 according to this embodiment. The optical information recording medium 2 is an optical information recording medium with a multi-layer structure that includes a plurality of information layers, and allows information recording/reproduction to be performed with respect to each information layer by irradiation of laser beams from one side.

In the optical information recording medium 2, n layers of first to n-th information layers $22_1$ to $22_n$ (n represents a natural number satisfying n≧2) are laminated on a substrate 21, and a transparent layer 23 further is provided on the information layers. In this specification, the first information layer and the n-th information layer when counting from a laser beam incidence side are referred to as the first information layer $22_1$ and the n-th information layer $22_n$, respectively. Each pair of the information layers adjacent to each other are laminated through an optical separation layer 24. In the optical information recording medium 2, each of the first to (n-1)-th information layers $22_1$ to $22_{n-1}$ is provided with a light transmission property. This is because it is necessary to allow laser beams to reach the n-th information layer $22_n$.

The substrate 21 and the transparent layer 23 can be made of the same materials of the substrate 11 and the transparent layer 13 described with regard to Embodiment 1, respectively. Further, these layers also have the same configurations and functions as in the case of Embodiment 1.

Preferably, the optical separation layer 24 is made of a resin such as a photocurable resin (particularly, an ultraviolet curable resin), a delayed action type thermosetting resin or the like, or a dielectric, and has a low light absorptance with respect to a laser beam to be used. Further, preferably, the optical separation layer 24 optically has a low birefringence at a wavelength in a short wavelength region.

The optical separation layer 24 provided between each pair of the adjacent information layers is used to separate the respective focusing positions of the first information layer $22_1$, the second information layer $22_2$, and the following information layers to the n-th information layer $22_n$ from one another. It is required that the optical separation layer 24 have a thickness of not less than a focal depth $\Delta Z$ determined by a numerical aperture (NA) of an objective lens and a wavelength $\lambda$ of a laser beam. Assuming that a light intensity of a focal point corresponds to 80% of that obtained when there is no aberration, the focal depth $\Delta Z$ can be approximated by a formula $\Delta Z=\lambda/\{2(NA)^2\}$. Where $\lambda$=400 nm and NA=0.6, $\Delta Z$=0.556 $\mu$m and thus ±0.6 $\mu$m defines a range of the focal depth. Thus, in this case, it is required that the optical separation layer 24 have a thickness of not less than 1.2 $\mu$m. Further, desirably, a distance between each pair of the adjacent information layers is set so as to be in a range that allows a laser beam to be focused using an objective lens. Thus, preferably, the optical separation layer 24 has a thickness that falls within a range of tolerances defined by an objective lens (for example, not more than 50 $\mu$m).

In the optical separation layer 24, guide grooves for guiding a laser beam may be formed as required on a surface on the laser beam incidence side. In this case, by irradiation of laser beams from one side alone, recording/reproduction can be performed with respect to a k-th information layer $22_k$ (k represents a natural number satisfying 1<k≦n) using a laser beam transmitted through the first information layer $22_1$ to a (k-1)-th information layer $22_{k-1}$.

Hereinafter, a configuration of the first information layer $22_1$ will be described in detail. The first information layer $22_1$ includes an incidence side protective film 25, an incidence side dielectric film (first dielectric film) 26, a recording film 27, a counter-incidence side dielectric film (second dielectric film) 28, a reflective film 29, and a transmittance adjusting film 30 that are arranged in order from the laser beam incidence side.

The incidence side protective film 25 can be made of the same material as that of the incidence side protective film 14 described with regard to Embodiment 1, and also has the same function as that of the incidence side protective film 14. By calculation based on the matrix method, the thickness of the incidence side protective film 25 can be determined so that a change in an amount of reflected light between when the recording film 27 is in a crystalline phase and when the recording film 27 is in an amorphous phase can be increased, and light absorption in the recording film 27 can be increased.

The incidence side dielectric film 26 can be made of the same material as that of the incidence side dielectric film 15 described with regard to Embodiment 1, and also has the same function and configuration as those of the incidence side dielectric film 15.

The counter-incidence side dielectric film 28 can be made of the same material as that of the counter-incidence side dielectric film 17 described with regard to Embodiment 1, and also has the same function and configuration as those of the counter-incidence side dielectric film 17.

The recording film 27 can be made of the same material as that of the recording film 16 described with regard to Embodiment 1. Preferably, the recording film 27 has a thickness as thin as possible for the following reason. That is, in order to allow laser beams in an amount required in recording/reproduction to reach the information layer (the information layer that is arranged away from a surface on a side on which laser beams are incident) with respect to which information recording/reproduction is performed using a laser beam transmitted through the first information layer $22_1$, it is required that the first information layer $22_1$ have a higher transmittance. For example, when the recording film 27 is made of any of a material represented by a composition formula $Ge_a(M2)_bTe_{3+a}$, a material in which the element (M3) is substituted for a part of Ge in $Ge_a(M2)_bTe_{3+a}$, and a material represented by a composition formula $(Ge_a(M2)_bTe_{3+a})_{100-c}(M4)_c$, the recording film 27 has a thickness, preferably, in a range of 3 nm to 9 nm, and more preferably, in a range of 4 nm to 8 nm. Further, when the recording film 27 is made of a material represented by a composition formula $(Sb_dTe_{100-d})_{100-e}(M5)e$, the recording film 27 has a thickness, preferably, in a range of 1 nm to 7 nm, and more preferably, in a range of 2 nm to 6 nm.

The reflective film 29 can be made of the same material as that of the reflective film 20 described with regard to Embodiment 1, and also has the same function as that of the reflective film 20. In order to obtain the highest possible transmittance of the first information layer $22_1$, the reflective film 29 has a thickness, preferably, in a range of 3 nm to 15 nm, and more preferably, in a range of 8 nm to 12 nm. The reflective film 29 has a thickness in this range, and thus a heat diffusing function can be performed sufficiently, and a sufficient reflectance in the first information layer $22_1$ can be secured. Further, a sufficient transmittance of the first information layer $22_1$ also can be attained.

The transmittance adjusting film 30 may be formed of a dielectric and has a function of adjusting the transmittance of the first information layer $22_1$. By this transmittance adjusting film 30, both a transmittance $T_c$ (%) in the first information layer $22_1$ obtained when the recording film 27 is in the crystalline phase and a transmittance $T_a$ (%) in the first information layer $22_1$ obtained when the recording film 27 is in the amorphous phase can be increased. Specifically, the first information layer $22_1$ including the transmittance adjusting film 30 has values of the transmittances $T_c$ and $T_a$ increased by about 2% to 10% compared with the first information layer $22_1$ without the transmittance adjusting film 30. Further, the transmittance adjusting film 30 also has a function of allowing heat generated in the recording film 27 to be diffused effectively.

In order to obtain a further enhanced action to increase the transmittances $T_c$ and $T_a$ of the first information layer $22_1$, the transmittance adjusting film 30 has a refractive index $n_1$ and an extinction coefficient $k_1$ that preferably satisfy $2.0 \leq n_1$ and $k_1 \leq 0.1$, and more preferably satisfy $2.0 \leq n_1 \leq 3.0$ and $k_1 \leq 0.05$, respectively.

The transmittance adjusting film 30 has a thickness $d_1$, preferably, in a range represented by $(1/32)\lambda/n_1 \leq d_1 \leq (3/16)\lambda/n_1$ or $(17/32)\lambda/n_1 \leq d_1 \leq (11/16)\lambda/n_1$, and more preferably in a range represented by $(1/16)\lambda/n_1 \leq d_1 \leq (5/32)\lambda/n_1$ or $(9/16)\lambda/n_1 \leq d_1 \leq (21/32)\lambda/n_1$. For example where a wavelength $\lambda$ of a laser beam and a refractive index $n_1$ of the transmittance adjusting film 30 satisfy $350$ nm $\leq \lambda \leq 450$ nm and $2.0 \leq n_1 \leq 3.0$, respectively, the thickness $d_1$ is, preferably, in a range represented by $3$ nm $\leq d_1 \leq 40$ nm or $60$ nm $\leq d_1 \leq 130$ nm, and more preferably, in a range represented by $7$ nm $\leq d_1 \leq 30$ nm or $65$ nm $\leq d_1 \leq 120$ nm. The thickness $d_1$ has a value selected from values in this range, and thus both the transmittances $T_c$ and $T_a$ of the information layer $22_1$ can be increased.

The transmittance adjusting film 30 can be made of, for example, an oxide such as $TiO_2$, $ZrO_2$, $HfO_2$, $ZnO$, $Nb_2O_5$, $Ta_2O_5$, $SiO_2$, $Al_2O_3$, or $Bi_2O_3$. Further, the transmittance adjusting film 30 also can be made of a nitride such as Ti—N, Zr—N, Nb—N, Ta—N, Si—N, Ge—N, Cr—N, Al—N, Ge—Si—N, Ge—Cr—N or the like. Further, a sulfide such as ZnS or the like also can be used. Further, a mixture of the above-mentioned materials also can be used. Preferably, among these materials, particularly, $TiO_2$ or a material containing $TiO_2$ is used. These materials have a high refractive index ($n_1$=2.5 to 2.8) and a low extinction coefficient ($k_1$=0.0 to 0.05), and thus the action to increase the transmittance of the first information layer $22_1$ can be enhanced.

In order to allow laser beams in an amount required for recording/reproduction to reach the second to n-th information layers $22_2$ to $22_n$, the transmittances $T_c$ and $T_a$ of the first information layer $22_1$ preferably satisfy $40 < T_c$ and $40 < T_a$, and more preferably satisfy $46 < T_c$ and $46 < T_a$, respectively.

The transmittances $T_c$ and $T_a$ of the first information layer $22_1$ preferably satisfy $-5 \leq (T_c - T_a) \leq 5$, and more preferably satisfy $-3 \leq (T_c - T_a) \leq 3$, respectively. If the transmittances $T_c$ and $T_a$ satisfy these conditions, when information recording/reproduction is performed with respect to the second to n-th information layers $22_2$ to $22_n$, less influence is caused by a change in transmittance depending on a state of the recording film 27 in the first information layer $22_1$, thereby allowing an excellent recording/reproduction property to be obtained.

Preferably, a reflectance $R_{c1}$ of the first information layer $22_1$ when the recording film 27 is in the crystalline phase and a reflectance $R_{a1}$ of the first information layer $22_1$ when the recording film 27 is in the amorphous phase satisfy $R_{a1} < R_{c1}$. This allows the reflectance to be higher in an initial state where information has not been recorded yet than in a state where the information has been recorded, thereby allowing a stable recording/reproducing operation to be performed. Further, in order to obtain an excellent recording/reproduction property by increasing a difference in reflectance ($R_{c1} - R_{a1}$), $R_{c1}$ and $R_{a1}$ preferably satisfy $0.1 \leq R_{a1} \leq 5$ and $4 \leq R_{c1} \leq 15$, and more preferably satisfy $0.1 \leq R_{a1} \leq 3$ and $4 \leq R_{c1} \leq 10$.

The information layers other than the first information layer $22_1$ that are included in the optical information recording medium 2 according to this embodiment may have the same film structure as that of the first information layer $22_1$, and further, may have another film structure. Further, at least one of a plurality of the information layers may have the same film structure as that of the first information layer $22_1$ described with regard to this embodiment, and the other information layers may have a different film structure. In this case, preferably, the first information layer $22_1$ arranged in a position closest to a surface on the laser beam incidence side has the film structure described with regard to this embodiment. Further, any one of the information layers other than the first information layer $22_1$ may be configured as a ROM (Read Only Memory) type information layer or as a WO (Write Once) type information layer that allows writing to be performed only once.

According to the optical information recording medium 2 having the above-mentioned configuration, excellent adhesion between the recording film 27 and each of the incidence side and counter-incidence side dielectric films 26 and 28 can be attained, thereby achieving high reliability, and an excellent rewriting capability can be obtained. Further, the crystallization ability of the recording film 27 is improved, thereby allowing larger capacity to be realized.

Embodiment 3

Figure 3:
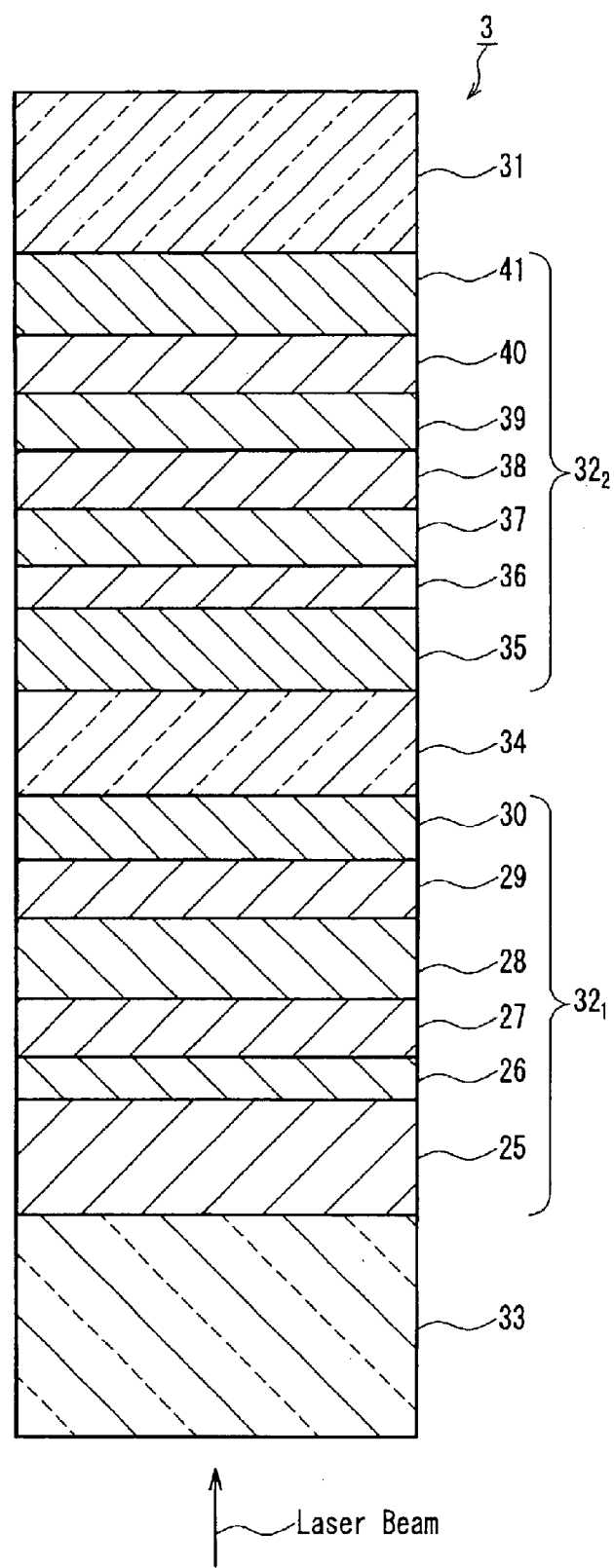
FIG. 3 is a cross sectional view showing a configuration of an optical information recording medium according to Embodiment 3 of the present invention.

The description is directed to still another embodiment of the optical information recording medium according to the present invention. FIG. 3 is a cross sectional view showing a configuration of an optical information recording medium 3 according to this embodiment. The optical information recording medium 3 is an optical information recording medium with a multi-layer structure that includes two information layers and allows information recording/reproduction to be performed with respect to each information layer by irradiation of laser beams from one side.

The optical information recording medium 3 is composed of a second information layer $32_2$, an optical separation layer 34, a first information layer $32_1$ and a transparent layer 33 that are laminated in order on a substrate 31. Laser beams are allowed to be incident from a side of the transparent layer 33. The substrate 31, the optical separation layer 34, the first information layer $32_1$ and the transparent layer 33 can be made of the same materials as those of the substrate 11 or 21, the optical separation layer 24, the first information layer $22_1$, and the transparent layer 13 or 23 described with regard to Embodiment 1 or 2, respectively, and also have the same configurations and functions as those of these substrate and layers.

Hereinafter, a configuration of the second information layer $32_2$ will be described in detail. The second information layer $32_2$ includes an incidence side protective film 35, an incidence side dielectric film first dielectric film) 36, a recording film 37, a counter-incidence side dielectric film (second dielectric film) 38, a counter-incidence side protective film 39, a metal film 40, and a reflective film 41 that are arranged in order from a laser beam incidence side. Information recording/reproduction is performed with respect to the second information layer $32_2$ using a laser beam transmitted through the transparent layer 33, the first information layer $32_1$ and the optical separation layer 34.

The incidence side protective film 35 can be made of the same material as that of the incidence side protective film 14 described with regard to Embodiment 1, and also has the same function as that of the incidence side protective film 14. By calculation based on the matrix method, the thickness of the incidence side protective film 35 can be determined so that a change in an amount of reflected light between when the recording film 37 is in a crystalline phase and when the recording film 37 is in an amorphous phase can be increased, and light absorption in the recording film 37 can be increased.

The incidence side dielectric film 36 can be made of the same material as that of the incidence side dielectric film 15 described with regard to Embodiment 1, and also has the same function and configuration as those of the incidence side dielectric film 15.

The counter-incidence side dielectric film 38 can be made of the same material as that of the counter-incidence side dielectric film 17 described with regard to Embodiment 1, and also has the same function and configuration as those of the counter-incidence side dielectric film 17.

The recording film 37 can be made of the same material as that of the recording film 16 described with regard to Embodiment 1, and also has the same thickness as that of the recording film 16.

The counter-incidence side protective film 39 can be made of the same material as that of the counter-incidence side protective film 18 described with regard to Embodiment 1, and also has the same function and configuration as those of the counter-incidence side protective film 18. A configuration without the counter-incidence side protective film 39 also is possible.

The metal film 40 can be made of the same material as that of the metal film 19 described with regard to Embodiment 1, and also has the same function and configuration as those of the metal film 19. A configuration without the metal film 40 also is possible.

The reflective film 41 can be made of the same material as that of the reflective film 20 described with regard to Embodiment 1, and also has the same function and configuration as those of the reflective film 20.

According to the optical information recording medium 3 having the above-mentioned configuration, in each of the first information layer $32_1$ and the second information layer $32_2$, excellent adhesion of each of the incidence side dielectric film 26 or 36 and the counter-incidence side dielectric film 28 or 38 to the recording film 27 or 37 can be attained, thereby achieving high reliability, and an excellent rewriting capability can be obtained. Further, the crystallization ability of the recording film 27 or 37 is improved, thereby allowing larger capacity to be realized.

Embodiment 4

Figure 4:
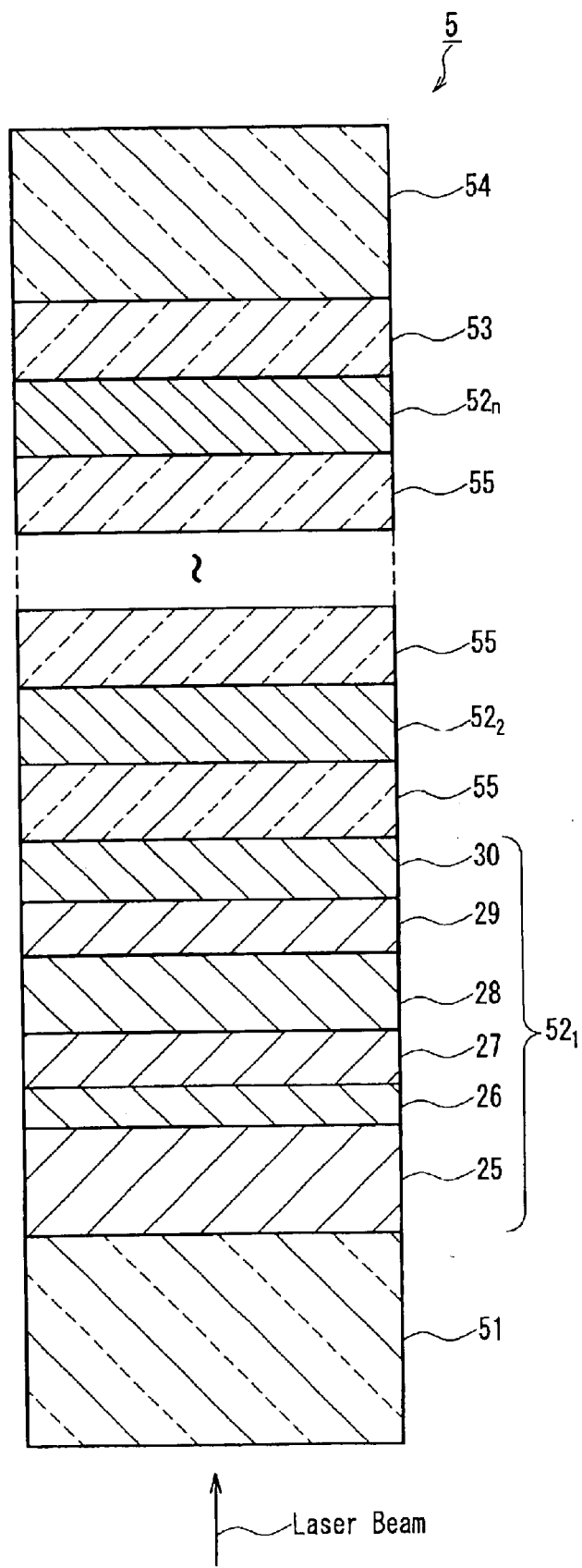
FIG. 4 is a cross sectional view showing a configuration of an optical information recording medium according to Embodiment 4 of the present invention.

The description is directed to still another embodiment of the optical information recording medium according to the present invention. FIG. 4 is a cross sectional view showing a configuration of an optical information recording medium 5 according to this embodiment. The optical information recording medium 5 is an optical information recording medium with a multi-layer structure that includes a plurality of information layers and allows recording/reproduction to be performed with respect to each information layer by irradiation of laser beams from one side.

In the optical information recording medium 5, unlike the optical information recording media 1 to 3 described with regard to Embodiments 1 to 3, a substrate 51 is arranged on a laser beam incidence side. N layers of first to n-th information layers $52_1$ to $52_n$ are laminated on the substrate 51, and a dummy substrate 54 further is arranged on the information layers through an adhesive layer 53. The n layers of the information layers $52_1$ to $52_n$ are laminated one over the other through an optical separation layer 55.

As in the case of the substrate 11 described with regard to Embodiment 1, each of the substrate 51 and the dummy substrate 54 is formed of a transparent disk-shaped substrate. Each of the substrate 51 and the dummy substrate 54 can be made of, for example, a resin such as polycarbonate, amorphous polyolefin, PMMA or the like, or glass.

Guide grooves for guiding a laser beam may be formed as required on a surface of the substrate 51 on a side of the first information layer $52_1$. Preferably, a surface of the substrate 51 on a side opposite the side of the first information layer $52_1$ is made smooth. Most preferably, as a material of each of the substrate 51 and the dummy substrate 54, polycarbonate is used since it exhibits an excellent transfer property and suitability for mass production and achieves a cost reduction. Preferably, the substrate 51 has a thickness in a range of 500 $\mu$m to 1,200 $\mu$m so as to have a sufficient strength and allow the optical information recording medium 5 as a whole to have a thickness of about 1,200 $\mu$m.

Preferably, the adhesive layer 53 is made of a resin such as a photocurable resin (particularly, an ultraviolet curable resin), a delayed action type thermosetting resin or the like, and has a low light absorptance with respect to a laser beam to be used. Further, preferably, the adhesive layer 53 optically has a low birefringence at a wavelength in a short wavelength region.

The first information layer $52_1$ has the same film structure as that of the first information layer $22_1$ described with regard to Embodiment 2, and also is the same in the materials of the respective films, configuration, function and the like as the first information layer $22_1$. Further, the optical separation layer 54 can be made of the same material as that of the optical separation layer 24 described with regard to Embodiment 2, and also has the same configuration and function as those of the optical separation layer 24.

According to the optical information recording medium 5 in which the substrate 51 is arranged on the laser beam incidence side as described above, the same effect as that of each of the optical information recording media 1 to 3 described with regard to Embodiments 1 to 3 also can be obtained.

Embodiment 5

The description is directed to a method for manufacturing an optical information recording medium according to the present invention. In this embodiment, a method for manufacturing the optical information recording medium 1 described with regard to Embodiment 1 will be explained.

Initially, the substrate 11 (having a thickness of, for example, 1,100 μm) is prepared and placed in a film forming device. Then, the information layer 12 is formed on the substrate 11. To be specific, first, the reflective film 20 is formed on the substrate 11. When the guide grooves for guiding a laser beam are formed on the substrate 11, the reflective film 20 is formed on a surface on which these guide grooves are formed. The reflective film 20 can be formed by performing sputtering with respect to a sputtering target formed of a metal or an alloy constituting the reflective film 20 in an Ar gas atmosphere or an atmosphere of a mixture of an Ar gas and a reactive gas (at least one gas selected from an oxygen gas and a nitrogen gas).

Then, the metal film 19 is formed on the reflective film 20 as required. The metal film 19 can be formed using a sputtering target formed of a metal or an alloy constituting the metal film 19 in the same manner as in the case of forming the reflective film 20.

Then, the counter incidence side protective film 18 is formed on the metal film 19 (in a configuration without the metal film 19, on the reflective film 20) as required. The counter-incidence side protective film 18 can be formed by performing sputtering with respect to a sputtering target formed of a compound constituting the counter-incidence side protective film. 18 in an Ar gas atmosphere or an atmosphere of a mixture of an Ar gas and a reactive gas. Further, the counter-incidence side protective film 18 also can be formed by performing reactive sputtering with respect to a sputtering target formed of a metal containing elements constituting the counter incidence side protective film 18 in an atmosphere of a mixture of an Ar gas and a reactive gas.

Then, the counter-incidence side dielectric film 17 is formed on the counter-incidence side protective film 18 (in a configuration without the counter-incidence side protective film 18, on the metal film 19 or the reflective film 20). The counter-incidence side dielectric film 17 can be formed by performing sputtering using a sputtering target (second sputtering target) containing a mixture $Cr_2O_3$-$(M1)O_2$ or a mixture $SiO_2$—$Cr_2O_3$-$(M1)O_2$. When the mixture contained in this sputtering target is $Cr_2O_3$-$(M1)O_2$, preferably, $Cr_2O_3$ is contained in an amount of not less than 15 mol % and not more than 80 mol % in the mixture. Further, when the mixture contained in this sputtering target is $SiO_2$—$Cr_2O_3$-$(M1)O_2$, preferably, $SiO_2$, $Cr_2O_3$, and $SiO_2$—$Cr_2O_3$ are contained in the respective amounts shown below:

$SiO_2$: not more than 35 mol %;
$Cr_2O_3$: not less than 15 mol % and not more than 80 mol %; and
$SiO_2$—$Cr_2O_3$: more than 15 mol % and not more than 95 mol %.

Sputtering is performed with respect to a sputtering target as described above in an Ar gas atmosphere or an atmosphere of a mixture of an Ar gas and a reactive gas, and thus the counter incidence side dielectric film 17 can be formed. In this case, since $Cr_2O_3$ can be formed more easily by sputtering than $(M1)O_2$ and $SiO_2$, preferably, in the sputtering target, $Cr_2O_3$ is contained in a somewhat reduced amount with respect to a predetermined film composition.

Then, the recording film 16 is formed on the counter-incidence side dielectric film 17. The recording film 16 can be formed by performing sputtering, using one power source, with respect to a sputtering target that is formed of a material selected from a Ge-M2-Te alloy, a Ge-M2-Te-M3 alloy, a Ge-M2-Te-M4 alloy, and a Sb—Te-M5 alloy according to the composition of the recording film 16.

As a gas used in an atmosphere for sputtering in forming the recording film 16, an Ar gas, a Kr gas, a mixture of an Ar gas and a reactive gas, or a mixture of a Kr gas and a reactive gas can be used. Further, the recording film 16 also can be formed by simultaneously performing sputtering, using a plurality of power sources, with respect to a sputtering target containing a required metal selected from Ge, Te, and the elements M2, M3, M4 and M5. Further, the recording film 16 also can be formed by simultaneously performing sputtering, using a plurality of power sources, with respect to a binary sputtering target, a ternary sputtering target or the like in which required elements selected from Ge, Te, and the elements M2, M3, M4 and M5 are combined. In each of these cases, the recording film 16 also can be formed by sputtering performed in an atmosphere of an Ar gas, a Kr gas, a mixture of an Ar gas and a reactive gas, or a mixture of a Kr gas and a reactive gas.

Then, the incidence side dielectric film 15 is formed on the recording film 16. The incidence side dielectric film 16 can be formed by performing sputtering using a sputtering target (first sputtering target) containing a mixture $Cr_2O_3$-$(M1)O_2$ or a mixture $SiO_2$—$Cr_2O_3$-$(M1)O_2$. When the mixture contained in this sputtering target is $Cr_2O_3$-$(M1)O_2$, preferably, $Cr_2O_3$ is contained in an amount of not less than 5 mol % and not more than 60 mol % in this mixture. Further, when the mixture contained in this sputtering target is $SiO_2$—$Cr_2O_3$-$(M1)O_2$, preferably, in this mixture, $SiO_2$, $Cr_2O_3$ and $SiO_2$+$Cr_2O_3$ are contained in the respective amounts shown below:

$SiO_2$: not less than 5 mol % and not more than 40 mol %;
$Cr_2O_3$: not less than 5 mol % and not more than 70 mol %;
$SiO_2$+$Cr_2O_3$: and not less than 10 mol % and not more than 95 mol %.

Sputtering is performed with respect to a sputtering target as described above in an Ar gas atmosphere or an atmosphere of a mixture of an Ar gas and a reactive gas, and thus the incidence side dielectric film 15 can be formed. Also in this case, since $Cr_2O_3$ can be formed more easily by sputtering than $(M1)O_2$ and $SiO_2$, preferably, in the sputtering target, $Cr_2O_3$ is contained in a somewhat reduced amount with respect to a predetermined film composition.

Then, the incidence side protective film 14 is formed on the incidence side dielectric film 15. The incidence side protective film 14 can be formed by performing sputtering with respect to a sputtering target formed of a compound constituting the incidence side protective film 14 in an Ar gas atmosphere or an atmosphere of a mixture of an Ar gas and a reactive gas. Further, the incidence side protective film 14 also can be formed by performing reactive sputtering with respect to a sputtering target formed of metal containing elements constituting the incidence side protective film 14 in an atmosphere of a mixture of an Ar gas and a reactive gas.

Finally, the transparent layer 13 is formed on the incidence side protective film 14. The transparent layer 13 can be formed by performing spin coating in which a photocurable resin (particularly, an ultraviolet curable resin) or a delayed action type thermosetting resin is applied on the incidence side protective film 14, after which the resin is allowed to cure. Further, the transparent layer 13 may be formed of a transparent disk-shaped substrate made of a resin such as polycarbonate, amorphous polyolefin, PMMA or the like, or glass. In this case, the transparent layer 13 can be formed by performing spin coating in which a resin such as a photocurable resin (particularly, an ultraviolet curable resin), a delayed action type thermosetting resin or the like is applied on the incidence side protective film 14, and then the substrate is bonded onto the incidence side protective film 14, after which the resin is allowed to cure. Further, it also is possible to bond a substrate, on which an adhesive resin is applied uniformly in advance, onto the incidence side protective film 14.

In this embodiment, a sputtering method was used as a method for forming each film. However, there is no limitation to the method to be used, and it also is possible to use a vacuum deposition method, an ion plating method, a CVD (Chemical Vapor Deposition) method, a MBE (Molecular Beam Epitaxy) method or the like.

After forming the incidence side protective film 14, or after forming the transparent layer 13, an initializing process in which an entire surface of the recording film 16 is crystallized may be performed as required. The recording film 16 can be crystallized by irradiation of laser beams.

The optical information recording medium 1 can be manufactured in the above-mentioned manner.

Embodiment 6

The description is directed to another embodiment of the method for manufacturing an optical information recording medium according to the present invention. In this embodiment, a method for manufacturing the optical information recording medium 2 described with regard to Embodiment 2 will be explained.

Initially, on the substrate 21 (having a thickness of, for example, 1,100 μm), (n−1) layers of the information layers composed of the n-th to second information layers $22_n$ to $22_2$ are laminated in order, separated by the optical separation layer 24. Each of the information layers is constituted of a single-layer or multi-layer film, and the films can be formed by sequentially performing sputtering with respect to sputtering targets used as materials, respectively, in a film forming device. Further, the optical separation layer 24 can be formed in the following manner. That is, a photocurable resin (particularly, an ultraviolet curable resin) or a delayed action type thermosetting resin is applied on the information layer. Then, the substrate 21 is rotated so that the resin can be spread uniformly (spin coating), and after that, the resin is allowed to cure When guide grooves for laser beams are formed on the optical separation layer 24, a transfer substrate (mold) with a surface on which grooves having a predetermined shape are formed is bonded to the resin before being cured. Then, the substrate 21 and the transfer substrate are rotated so that spin coating is performed, and after that, the resin is allowed to cure. Subsequently, the transfer substrate is peeled off from the resin that has been cured, thereby allowing the optical separation layer 24 with a surface on which predetermined guide grooves are formed to be formed.

As described above, (n−1) layers of the information layers are laminated in order on the substrate 21, separated by the optical separation layer 24, and the optical separation layer 24 further is formed on the information layers. Then, the first information layer $22_1$ is formed on the optical separation layer 24 formed on the (n−1) layers of the information layers. To be specific, initially, the substrate 21 on which the (n−1) layers of the information layers and the optical separation layers 24 are formed is placed in the film forming device, where the transmittance adjusting film 30 is formed on the optical separation layer 24. The transmittance adjusting film 30 can be formed by performing sputtering with respect to a sputtering target formed of a compound constituting the transmittance adjusting film 30 in an Ar gas atmosphere or an atmosphere of a mixture of an Ar gas and a reactive gas. Further, the transmittance adjusting film 30 also can be formed by performing reactive sputtering in an atmosphere of a mixture of an Ar gas and a reactive-gas using a metal formed of elements constituting the transmittance adjusting film 30 as a sputtering target.

Then, the reflective film 29 is formed on the transmittance adjusting film 30 The reflective film 29 can be formed in the same manner as in the case of forming the reflective film 20 described with regard to Embodiment 5.

Then, the counter-incidence side dielectric film 28 is formed on the reflective film 29 The counter-incidence side dielectric film 28 can be formed in the same manner as in the case of forming the counter-incidence side dielectric film 17 described with regard to Embodiment 5.

Then, the recording film 27 is formed on the counter-incidence side dielectric film 28. The recording film 27 can be formed in the same manner as in the case of forming the recording film 16 described with regard to Embodiment 5.

Then, the incidence side dielectric film 26 is formed on the recording film 27. The incidence side dielectric film 26 can be formed in the same manner as in the case of forming the incidence side dielectric film 15 described with regard to Embodiment 5.

Then, the incidence side protective film 25 is formed on the incidence side dielectric film 26. The incidence side protective film 25 can be formed in the same manner as in the case of forming the incidence side protective film 14 described with regard to Embodiment 5.

Finally, the transparent layer 23 is formed on the incidence side protective film 25 The transparent layer 23 can be formed in the same manner as in the case of forming the transparent layer 13 described with regard to Embodiment 5.

After forming the incidence side protective film 25, or after forming the transparent layer 23, an initialing process in which an entire surface of the recording film 27 is crystallized may be performed as required. The recording film 27 can be crystallized by irradiation of laser beams.

The optical information recording medium 2 can be manufactured in the above-mentioned manner.

Embodiment 7

The description is directed to another embodiment of the method for manufacturing an optical information recording medium according to the present invention. In this embodiment, a method for manufacturing the optical information recording medium 3 described with regard to Embodiment 3 will be explained.

Initially, the second information layer $32_2$ is formed on the substrate 31. To be specific, initially, the substrate 31 (having a thickness of, for example, 1,100 μm) is prepared and placed in a film forming device.

Then, the reflective film 41 is formed on the substrate 31. When guide grooves for guiding a laser beam are formed on the substrate 31, the reflective film 41 is formed on a surface on which the guide grooves are formed. The reflective film 41 can be formed in the same manner as in the case of forming the reflective film 20 described with regard to Embodiment 5.

Then, the metal film 40 is formed on the reflective film 41 as required. The metal film 40 can be formed in the same manner as in the case of forming the metal film 19 described with regard to Embodiment 5.

Then, the counter-incidence side protective film 39 is formed on the metal film 40 (when the metal film 40 is not provided, on the reflective film 41) as required. The counter-incidence side protective film 39 can be formed in the same manner as in the case of forming the counter-incidence side protective film 18 described with regard to Embodiment 5.

Then, the counter-incidence side dielectric film 38 is formed on the counter-incidence side protective film 39 (when the counter-incidence side protective film 39 is not provided, on the metal film 40 or the reflective film 41). The counter-incidence side dielectric film 38 can be formed in the same manner as in the case of forming the counter-incidence side dielectric film 17 described with regard to Embodiment 5.

Then, the recording film 37 is formed on the counter-incidence side dielectric film 38. The recording film 37 can be formed in the same manner as in the case of forming the recording film 16 described with regard to Embodiment 5.

Then, the incidence side dielectric film 36 is formed on the recording film 37. The incidence side dielectric film 36 can be formed in the same manner as in the case of forming the incidence side dielectric film 15 described with regard to Embodiment 5.

Then, the incidence side protective film 35 is formed on the incidence side dielectric film 36. The incidence side protective film 35 can be formed in the same manner as in the case of forming the incidence side protective film 14 described with regard to Embodiment 5.

The second information layer $32_2$ can be formed in the above-mentioned manner.

Then, the optical separation layer 34 is formed on the incidence side protective film 35 of the second information layer $32_2$. The optical separation layer 34 can be formed in the same manner as in the case of forming the optical separation layer 24 described with regard to Embodiment 6.

After forming the incidence side protective film 35, or after forming the optical separation layer 34, an initializing process in which an entire surface of the recording film 37 is crystallized may be performed as required. The recording film 37 can be crystallized by irradiation of laser beams.

Then, the first information layer $32_1$ is formed on the optical separation layer 34. Specifically, the transmittance adjusting film 30, the reflective film 29, the counter-incidence side dielectric film 28, the recording film 27, the incidence side dielectric film 26, and the incidence side protective film 25 are formed in this order on the optical separation layer 34. These films can be formed in the same manners as those described with regard to Embodiment 5, respectively.

Finally, the transparent layer 33 is formed on the incidence side protective film 25. The transparent layer 33 can be formed in the same manner as in the case of forming the transparent layer 13 described with regard to Embodiment 5.

After forming the incidence side protective film 25, or after forming the transparent layer 33, an initializing process in which an entire surface of the recording film 27 is crystallized may be formed as required. The recording film 27 can be crystallized by irradiation of laser beams.

Furthermore, after forming incidence side protective film 25 of the first information layer $32_1$, or after forming the transparent layer 33, an initializing process in which an entire surface of each of the recording film 37 of the second information layer $32_2$ and the recording film 27 of the first information layer $32_1$ may be performed as required. In this case, preferably, the recording film 37 of the second information layer $32_2$ is crystallized before the recording film 27 of the first information layer $32_1$ is crystallized.

The optical information recording medium 3 can be manufactured as in the above-mentioned manner.

Embodiment 8

The description is directed to still another embodiment of the method for manufacturing an optical information recording medium according to the present invention. In this embodiment, a method for manufacturing the optical information recording medium 5 described with regard to Embodiment 4 will be explained.

Initially, the first information layer $52_1$ is formed on the substrate 51 (having a thickness of, for example, 600 μm). When guide grooves for guiding a laser beam are formed on the substrate 51, the first information layer $52_1$ is formed on a surface on which the guide grooves are formed. Specifically, the substrate 51 is placed in a film forming device, where the incidence side protective film 25, the incidence side dielectric film 26, the recording film 27, the counter-incidence side dielectric film 28, the reflective film 29, and the transmittance adjusting film 30 are laminated in order, i.e., these films are laminated in reverse order to the order in the case of the first information layer $22_1$ described with regard to Embodiment 6. The films are formed in the respective manners described with regard to Embodiment 6.

After that, (n−1) layers of the second to n-th information layers $52_2$ to $52_n$ are laminated in order, separated by the optical separation layer 55. Each of the information layers is constituted of a single-layer film or a multi-layer film, and the films can be formed, as in the respective manners described with regard to Embodiment 6, by sequentially performing sputtering with respect to sputtering targets used as materials, respectively, in the film forming device.

Finally, the n-th information layer $52_n$ and the dummy substrate 54 are laminated to each other with the adhesive layer 53. Specifically, this process should be performed in the following manner. That is, a resin such as a photocurable resin (particularly, an ultraviolet curable resin), a delayed action type thermosetting resin or the like is applied on the n-th information layer $52_n$. The dummy substrate 54 is bonded onto the n-th information layer $52_n$ through this resin, and a laminate thus obtained is subjected to spin coating, after which the resin is allowed to cure. Further, it also is possible to bond the dummy substrate 54, on which an adhesive resin is applied uniformly in advance, onto the n-th information layer $52_n$.

After the dummy substrate 54 is bonded, an initializing process in which an entire surface of the recording film 27 of the first information layer $52_1$ is crystallized may be performed as required. The recording film 27 can be crystallized by irradiation of laser beams.

The optical information recording medium 5 can be manufactured in the above-mentioned manner.

Embodiment 9

Figure 5:
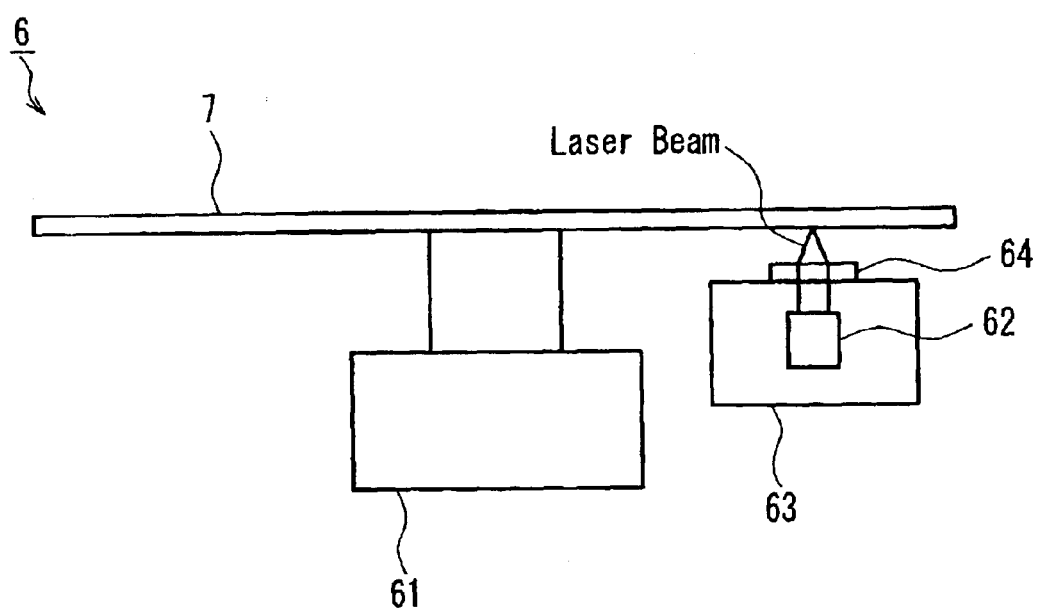
FIG. 5 is schematic diagram for explaining a part of the configuration of a recording/reproducing device that performs information recording/reproduction with respect to the optical information recording medium according to the present invention.
Figure 6:
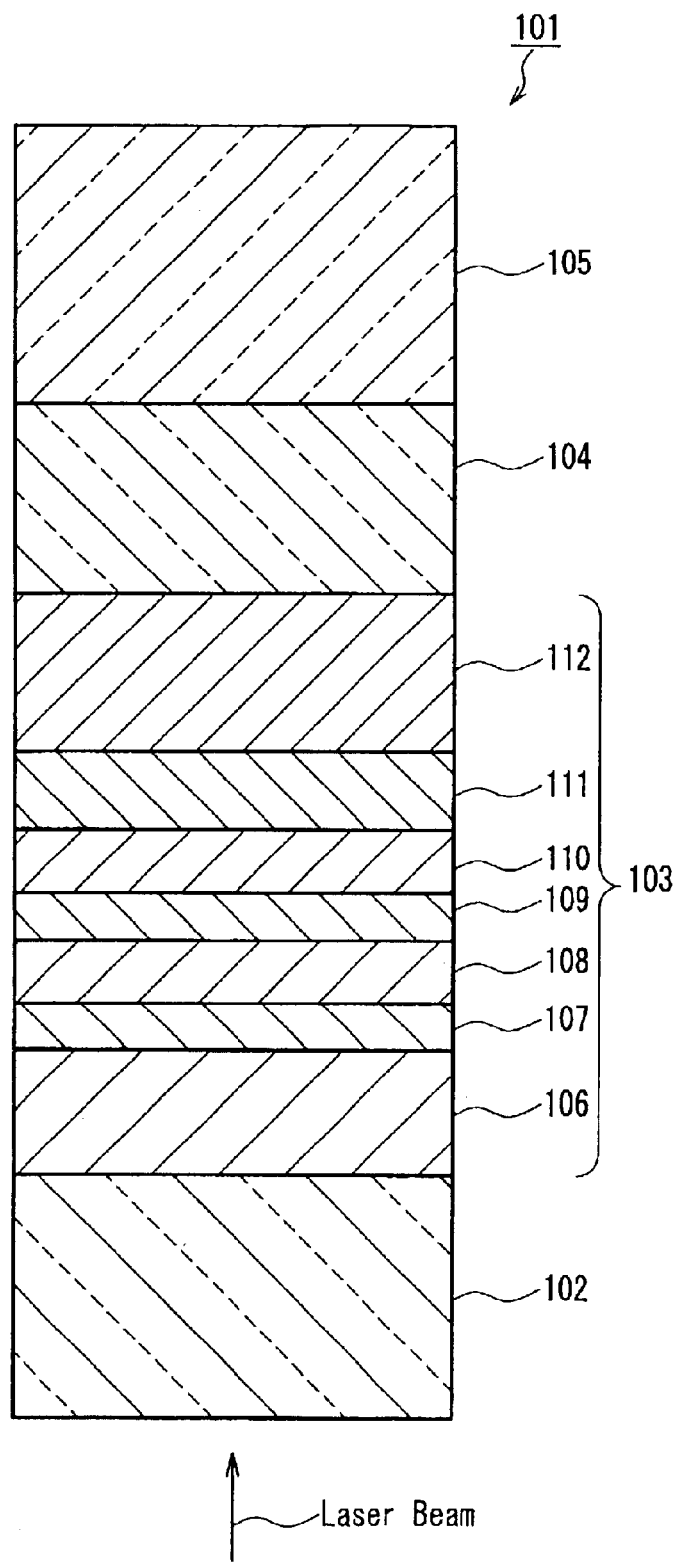
FIG. 6 is a cross sectional view showing a configuration of a conventional optical information recording medium.

The description is directed to a method for performing information recording/reproduction with respect to the optical information recording medium 1, 2, 3 or 5 described with regard to Embodiment 1, 2, 3 or 4, respectively. FIG. 5 is a schematic diagram showing a par of the configuration of a recording/reproducing device 6 used in a recording/reproducing method according to this embodiment. The recording/reproducing device 6 includes a spindle motor 61 for allowing an optical information recording medium 7 to rotate, an optical head 63 provided with a semiconductor laser 62, and an objective lens 64 for focusing a laser beam emitted from the semiconductor laser 62. The optical information recording medium 7 is formed of the optical information recording medium 1, 2, 3 or 5 and includes one information layer or a plurality of information layers (for example, the first information layer $32_1$ and the second information layer $32_2$ in the optical information recording medium 3). The objective lens 64 focuses a laser beam on each information layer of the optical information recording medium 7.

With respect to the optical information recording medium 7, information recording, erasing, and overwrite recording are performed by modulating the power level of laser beams into a high power, i.e., a peak power ($P_p$(mW)) and a low power, i.e., a bias power ($P_b$(mW)). By irradiation of a laser beam at the peak power level, an amorphous phase is formed locally in a portion of the recording film included in the information layer, and the amorphous phase forms into a recording mark. Each area between the recording marks is irradiated with a laser beam at the bias power level, so that a crystalline phase (erased portion) is formed therein. When irradiating a laser beam at the peak power level, generally, the laser beam is irradiated in the form of a train of pulses, i.e., a multi-pulse. The multi-pulse may be a result of modulation using only the peak power level and the bias power level, or may be a result of modulation using power levels in a range of 0 mW to the peak power level.

Furthermore, a reproduction power ($P_r$(mW)) is defined as a power that has a power level lower than either of the peak power level and the bias power level, at which irradiation of a laser beam exerts no influence on an optical state of a recording mark, and an amount of reflected light sufficient to reproduce the recording mark can be obtained from the optical information recording medium 7. A signal from the optical information recording medium 7 that can be obtained by irradiation of a laser beam at the reproduction power level is read out by a detector, thereby allowing reproduction of an information signal to be performed.

In order to adjust a spot diameter of a laser beam to a value in a range of 0.4 μm to 0.7 μm, the objective lens 64 has a numerical aperture (NA) that falls within a range of, preferably, 0.5 to 1.1 (more preferably, 0.6 to 1.0). The laser beam has a wavelength, preferably, of not more than 450 nm (more preferably, in a range of 350 nm to 450 nm). When recording information, the optical information recording medium 7 has a linear velocity, preferably in a range of 3 m/sec. to 20 m/sec.(more preferably in a range of 4 m/sec. to 15 m/sec.), which prevents crystallization from being caused by a laser beam used for reproduction and allows a sufficient erasing rate to be attained.

For example, in the case where the optical information recording medium 7 is formed of the optical information recording medium 3 including the two information layers, when recording is performed with respect to the first information layer $32_1$, a laser beam is adjusted to form a focal point in the recording film 27, and information is recorded on the recording film 27 using a laser beam transmitted through the transparent layer 33. The information is reproduced by using a laser beam that is reflected by the recording film 27 to be transmitted through the transparent layer 33. Meanwhile, when recording is performed with respect to the second information layer $32_2$, a laser beam is adjusted to form a focal point in the recording film 37, and information is recorded using a laser beam transmitted through the transparent layer 33, the first information layer $32_1$ and the optical separation layer 34. The information is reproduced by using a laser beam that is reflected by the recording film 37 to be transmitted through the optical separation layer 34, the first information layer $32_1$ and the transparent layer 33.

When guide grooves for guiding a laser beam are formed on a surface of each of the substrate 31 and the optical separation layer 34 of the optical information recording medium 3, information may be recorded on a surface of the grooves (grooves) on a near side from the laser beam incidence side or on a surface of the grooves (lands) on a far side from the laser beam incidence side. Further, information may be recorded on both the grooves and the lands.

EXAMPLES

Hereinafter, the present invention will be described in further detail by way of examples.

Examples 1 to 6 and Comparative Example 1 to 4

As an optical information recording medium to be used for Examples 1 to 6 and Comparative Examples 1 to 4, an optical information recording medium including one information layer that is formed of the first information layer $22_1$ of the optical information recording medium 2 shown in FIG. 2 was manufactured. That is, the optical information recording medium was manufactured by including only the first information layer $22_1$ between the substrate 21 and the transparent layer 23 in the optical information recording medium 2. In the optical information recording medium used for Examples 1 to 6 and Comparative Examples 1 to 4, each of the incidence side dielectric film 26 and the counter-incidence side dielectric film 28 included in the information layer is constituted of elements Cr, Zr and O (formed of a mixture $Cr_2O_3$—$ZrO_2$). However, in the examples and the comparative examples, a Cr atom concentration ($Cr_2O_3$ content) differs from one example to another.

To be specific, initially, a polycarbonate substrate (having a diameter of 120 mm and a thickness of 1,100 μm) on which guide grooves (having a depth of 20 nm and a track pitch of 0.32 μm) for guiding a laser beam were formed was prepared as the substrate 21. Then, on the polycarbonate substrate, a $TiO_2$ film (thickness: 20 nm) as the transmittance adjusting film 30, an Ag—Pd—Cu film as the reflective film 29, a $Cr_2O_3$—$ZrO_2$ film (thickness: about 10 nm) as the counter-incidence side dielectric film 28, a $G_{22}Sb_2Te_{25}$ film (thickness: 6 nm) as the recording film 27, a $Cr_2O_3$—$ZrO_2$ film (thickness: 5 nm) as the incidence side dielectric film 26, and a ZnS—$SiO_2$ film (thickness: about 40 nm, Zns: 80 mol %, $SiO_2$: 20 mol %) as the incidence side protective film 25 were laminated in this order by sputtering. Finally, an ultraviolet curable resin (DVD-003 manufactured by Nippon Kayaku Co., Ltd.) was applied on the incidence side protective film 25, and a polycarbonate substrate (having a diameter of 120 mm and a thickness of 70 μm) was bonded to the incidence side protective film 25. A laminate thus obtained was subjected to spin coating followed by ultraviolet irradiation, where the resin was allowed to cure, and thus the transparent layer 23 was formed. After that, an initializing process for crystallizing the recording film 27 was performed.

In the above-mentioned manner, the optical information recording medium to be used for Examples 1 to 6 and Comparative Examples 1 to 4 was manufactured. Samples of the optical information recording medium used for these examples varied in Cr atom concentration of each of the incidence side dielectric film 26 and the counter-incidence side dielectric film 28. The materials of the incidence side dielectric film 26 and the counter-incidence side dielectric film 28 in each of the samples of the optical information recording medium used for Examples 1 to 6 and Comparative Examples 1 to 4 are shown in Table 1.

The incidence side dielectric film 26 and the counter-incidence side dielectric film 28 in each of Examples 1 to 6 and Comparative Examples 1 to 4 have thicknesses determined precisely by calculation based on the matrix method. Specifically, these thicknesses were determined so that at a wavelength of 405 nm, a reflectance $R_{c1}$ (reflection in a mirror-surface portion of the substrate) in the information layer when the recording film 27 was in a crystalline phase satisfies $4 \leq R_{c1} \leq 10$ as much as possible, and a reflectance $R_{a1}$ (reflection in the mirror-surface portion of the substrate) in the information layer when the recording film 27 was in an amorphous phase satisfies $0.5 \leq R_{a1} \leq 3$ as much as possible.

With respect to each of the samples of the optical information recording medium used for the examples and the comparative examples that were formed in the above-mentioned manner, an evaluation was performed for adhesion between the incidence side dielectric film 26 and the recording film 27 and between the counter-incidence side dielectric film 28 and the recording film 27, and a repeated rewriting capability.

Initially, a possible number of times of recording/rewriting of each sample of the optical information recording medium was determined using the recording/reproducing device 6 shown in FIG. 5. In this case, a laser beam having a wavelength of 405 nm was used, and the objective lens 64 was set to have a numerical aperture (NA) of 0.85. In the determination, each sample had a linear velocity of 5.0 m/s, and the shortest mark length of 0.149 μm was obtained. The guide grooves of the substrate had a track pitch of 0.32 μm. Further, information was recorded on the grooves.

The recording/rewriting capability was evaluated in the following manner. That is, a laser beam was modulated in power level between $P_p$ and $P_b$, and random signals having a mark length of 0.149 μm (2T) to 0.596 μm (8T) were recorded sequentially on the same groove by a (1–7) modulation method. The evaluation was performed by measuring, at each time of recording/rewriting, a leading edge jitter (jitter at a leading edge portion of a recording mark), a trailing edge jitter (jitter at a trailing edge portion of a recording mark) and an average value of a leading edge jitter and a trailing edge jitter using a time interval analyzer. The number of times of rewriting at which a jitter value is increased by 3% with respect to a jitter value obtained at the first time was defined as an upper limit value of the repeated rewriting capability. The power levels $P_p$ and $P_b$ were determined so that the smallest average jitter value could be obtained.

After that, an evaluation of the adhesion between the materials of the incidence side dielectric film 26 and the recording film 27 and between the counter-incidence side dielectric film 28 and the recording film 27 was performed. The adhesion was evaluated using regions other than a portion used for the evaluation of the recording/rewriting capability. Specifically, under the conditions of a temperature of 90° C. and a relative humidity of 80%, each sample of the optical information recording medium was left standing in a humidistat tank for 100 hours, and then a visual observation was performed using an optical microscope to check whether peeling was caused between the incidence side dielectric film 26 and the recording film 27 and between the counter-incidence side dielectric film 28 and the recording film 27.

The results of the above-mentioned evaluations are shown in Table 1. In Table 1, a mixture of x mol % $Cr_2O_3$-(100-x) mol % $ZrO_2$ was represented by $(Cr_2O_3)_x(ZrO_2)_{100-x}$.

TABLE 1

|  | Material of Incidence side Dielectric Film | Material of C-Incidence side Dielectric Film | Peeling | Possible No. of Times of Rewriting (times) |
|---|---|---|---|---|
| Ex. 1 | $(Cr_2O_3)_{10}(ZrO_2)_{90}$ $(Cr_6Zr_{28.1}O_{65.6})$ | $(Cr_2O_3)_{20}(ZrO_2)_{80}$ $(Cr_{11.8}Zr_{23.5}O_{64.7})$ | Not caused | 5,000 |
| Ex. 2 | $(Cr_2O_3)_{10}(ZrO_2)_{90}$ $(Cr_{40}Zr_{2}O_{3})_{60}$ $(Cr_{21.1}Zr_{15.8}O_{63.1})$ | $(Cr_2O_3)_{80}(ZrO_2)_{20}$ $(Cr_{34.8}Zr_{4.3}O_{60.9})$ | Not caused | 1,000 |
| Ex. 3 | $(Cr_2O_3)_{40}(ZrO_2)_{60}$ $(Cr_{21.1}Zr_{15.8}O_{63.1})$ | $(Cr_2O_3)_{50}(ZrO_2)_{50}$ $(Cr_{25.0}Zr_{12.5}O_{62.5})$ | Not caused | 3,000 |
| Ex. 4 | $(Cr_2O_3)_{60}(ZrO_2)_{40}$ $(Cr_{28.6}Zr_{9.5}O_{61.9})$ | $(Cr_2O_3)_{80}(ZrO_2)_{20}$ $(Cr_{34.8}Zr_{4.3}O_{6.09})$ | Not caused | 1,000 |
| Ex. 5 | $(Cr_2O_3)_{70}(ZrO_2)_{30}$ $(Cr_{31.8}Zr_{6.8}O_{61.4})$ | $(Cr_2O_3)_{80}(ZrO_2)_{20}$ $(Cr_{34.8}Zr_{4.3}O_{60.9})$ | Not caused | 500 |
| Ex. 6 | $(Cr_2O_3)_{60}(ZrO_2)_{40}$ $(Cr_{28.6}Zr_{9.5}O_{61.9})$ | $(Cr_2O_3)_{90}(ZrO_2)_{10}$ $(Cr_{37.5}Zr_{2.1}O_{60.4})$ | Not caused | 500 |
| Com. Ex. 1 | $(Cr_2O_3)_{5}(ZrO_2)_{95}$ $(Cr_{3.2}Zr_{30.6}O_{66.2})$ | $(Cr_2O_3)_{10}(ZrO_2)_{90}$ $(Cr_{6.3}Zr_{28.1}O_{65.6})$ | Caused (I side-C-I side) | 7,000 |
| Com. Ex. 2 | $(Cr_2O_3)_{5}(ZrO_2)_{95}$ $(Cr_{3.2}Zr_{30.6}O_{66.2})$ | $(Cr_2O_3)_{80}(ZrO_2)_{20}$ $(Cr_{34.8}Zr_{4.3}O_{60.9})$ | Caused (Incidence side) | 1,000 |

TABLE 1-continued

|  | Material of Incidence side Dielectric Film | Material of C-Incidence side Dielectric Film | Peeling | Possible No. of Times of Rewriting (times) |
|---|---|---|---|---|
| Com. Ex. 3 | $(Cr_2O_3)_{10}(ZrO_2)_{90}$ $(Cr_{6.3}Zr_{28.1}O_{65.6})$ | $(Cr_2O_3)_{10}(ZrO_2)_{90}$ $(Cr_{6.3}Zr_{28.1}O_{65.6})$ | Caused (C-Incidence side) | 7,000 |
| Com. Ex. 4 | $(Cr_2O_3)_{20}(ZrO_2)_{80}$ $(Cr_{11.8}Zr_{2.5}O_{64.7})$ | $(Cr_2O_3)_{10}(ZrO_2)_{90}$ $(Cr_{6.3}Zr_{28.1}O_{65.6})$ | Caused (C-Incidence side) | 5,000 |

As shown in Table 1, in each sample of the optical information recording medium used for Examples 1 to 6, the counter-incidence side dielectric film 28 has a Cr atom concentration that is higher than that of the incidence side dielectric film 26. Moreover, the incidence side dielectric film 26 has a Cr atom concentration of not less than 6 at %, and the counter-incidence side dielectric film 28 has a Cr atom concentration of not less than 9 at %. Further, where the material of the incidence side dielectric film 26 is represented by $x_1$ mol % $Cr_2O_3$-(100-$x_1$) mol % $ZrO_2$, and the material of the counter-incidence side dielectric film 28 is represented by $x_2$ mol % $Cr_2O_3$-(100-$x_2$) mol % $ZrO_2$, in each sample of the optical information recording medium used for Examples 1 to 6, $10 \leq x_1$, $20 \leq x_2$, and $x_1 < x_2$ are satisfied. In each of the above-mentioned samples of optical information recording medium used for Examples 1 to 6, peeling was prevented from being caused between the incidence side dielectric film 26 and the recording film 27 and between the counter-incidence side dielectric film 28 and the recording film 27, and sufficient adhesion was attained there between. Further, in each sample of the optical information recording medium used for Examples 1 to 4, an excellent possible number of times of repeated rewriting was achieved, and the number obtained was not less than 1,000 times. On the other hand, in each sample of the optical information recording medium used for Examples 5 and 6, only an insufficient possible number of times of repeated rewriting was obtained, and the number obtained was 500 times. This confirmed that as $Cr_2O_3$ contents of the incidence side dielectric film 26 and the counter-incidence side dielectric film 28 are increased, the possible number of times of repeated rewriting was decreased gradually. Thus, it was revealed that as long as adhesion could be secured, $Cr_2O_3$ should be contained in the smallest possible amount, and it is preferable that $x_1 \leq 60$ and $x_2 \leq 80$ are satisfied.

Furthermore, in each sample of the optical information recording medium used for Comparative Examples 1 and 2, the counter-incidence side dielectric film 28 has a Cr atom concentration that is higher than that of the incidence side dielectric film 26 (in the mixture $Cr_2O_3$—$ZrO_2$, the counter-incidence side dielectric film 28 has a $Cr_2O_3$ content that is larger than that of the incidence side dielectric film 26). However, in the case of Comparative Example 1, each of the incidence side and counter-incidence side dielectric films 26 and 28 had a Cr atom concentration ($Cr_2O_3$ content) that was too low, and thus peeling was caused between each of the dielectric films 26 and 28 and the recording film 27. In the case of Comparative Example 2, the incidence side dielectric film 26 had a Cr atom concentration ($Cr_2O_3$ content) that was too low, and thus peeling was caused between the incidence side dielectric film 26 and the recording film 27. Further, in each sample of the optical information recording medium used for Comparative Examples 3 and 4, the counter-incidence side dielectric film 28 had a Cr atom concentration not higher than that of the incidence side dielectric film 26, which was too low, and thus peeling was caused between the counter-incidence side dielectric film 28 and the recording film 27.

Examples 7 to 13 and Comparative Examples 5 to 8

As an optical information recording medium to be used for Examples 7 to 13 and Comparative Examples 5 to 8, an optical information recording medium including one information layer that is formed of the first information layer $22_1$ of the optical information recording medium 2 shown in FIG. 2 was manufactured. That is, the optical information recording medium was manufactured by including only the first information layer $22_1$ between the substrate 21 and the transparent layer 23 in the optical information recording medium 2. In the optical information recording medium used for Examples 7 to 13 and Comparative Examples 5 to 8, each of the incidence side dielectric film 26 and the counter-incidence side dielectric film 28 included in the information layer is constituted of elements Si, Cr, Zr and O (formed of a mixture $SiO_2$—$CrO_3$—$ZrO_2$). However, in the examples and the comparative examples, a Si atom concentration and a Cr atom concentration ($SiO_2$ content and $Cr_2O_3$ content) differ from one example to another.

The optical information recording medium to be used for Examples 7 to 13 and Comparative Examples 5 to 8 was manufactured in the same manner as in the case of the optical information recording medium to be used for Examples 1 to 6 and Comparative Examples 1 to 4, except that the materials of the incidence side dielectric film 26 and the counter-incidence side dielectric film 28 were different. The materials of the incidence side dielectric film 26 and the counter-incidence side dielectric film 28 in each sample of the optical information recording medium used for Examples 7 to 13 and Comparative Examples 5 to 8 are shown in Table 2. In Table 2, y mol % $SiO_2$-x mol % $Cr_2O_3$-(100-x-y) mol % $ZrO_2$ was represented by $(SiO_2)_y(Cr_2O_3)_x(ZrO_2)_{100-x-y}$.

With respect to each sample of the optical information recording medium formed in the above-mentioned manner, examination of the adhesion between the incidence side dielectric film 26 and the recording film 27 and between the counter-incidence side dielectric film 28 and the recording film 27, and a repeated rewriting capability was performed in the same manner as in the case of Examples 1 to 6 and Comparative Examples 1 to 4. The results of the examination also are shown in Table 2.

TABLE 2

| | Meterial of Incidence side Dielectric Film | Material of C-Incidence side Dielectric Film | Peeling | Possible No. of Times of (times) |
|---|---|---|---|---|
| Ex. 7 | $(SiO_2)_5(Cr_2O_3)_{10}(ZrO_2)_{85}$ $(Si_{1.6}Cr_{6.2}Zr_{26.6}O_{65.6})$ | $(SiO_2)_3(Cr_2O_3)_{20}(ZrO_2)_{77}$ $(Si_{0.9}Cr_{11.8}Zr_{22.6}O_{64.7})$ | Not caused | 5,000 |
| Ex. 8 | $(SiO_2)_{20}(Cr_2O_3)_{30}(ZrO_2)_{50}$ $(Si_{5.6}Cr_{16.7}Zr_{13.9}O_{63.8})$ | $(SiO_2)_{10}(Cr_2O_3)_{20}(ZrO_2)_{70}$ $(Si_{2.9}Cr_{11.8}Zr_{20.6}O_{64.7})$ | Not caused | 7,000 |
| Ex. 9 | $(SiO_2)_{35}(Cr_2O_3)_{30}(ZrO_2)_{35}$ $(Si_{9.7}Cr_{16.7}Zr_{9.7}O_{63.9})$ | $(SiO_2)_{20}(Cr_2O_3)_{30}(ZrO_2)_{50}$ $(Si_{5.6}Cr_{16.7}Zr_{13.9}O_{63.8})$ | Not caused | 10,000 |
| Ex.10 | $(SiO_2)_{35}(Cr_2O_3)_{30}(ZrO_2)_{35}$ $(Si_{9.7}Cr_{16.7}Zr_{9.7}O_{63.9})$ | $(SiO_2)_{35}(Cr_2O_3)_{50}(ZrO_2)_{15}$ $(Si_{8.75}Cr_{25}Zr_{3.75}O_{62.5})$ | Not caused | 7,000 |
| Ex.11 | $(SiO_2)_{25}(Cr_2O_3)_{50}(ZrO_2)_{25}$ $(Si_{6.25}Cr_{25}Zr_{6.25}O_{62.5})$ | $(SiO_2)_{15}(Cr_2O_3)_{60}(ZrO_2)_{25}$ $(Si_{3.6}Cr_{28.6}Zr_{5.9}O_{61.9})$ | Not Caused | 5,000 |
| Ex. 12 | $(SiO_2)_{35}(Cr_2O_3)_{60}(ZrO_2)_5$ $(Si_{8.3}Cr_{28.6}Zr_{1.2}O_{61.9})$ | $(SiO_2)_{25}(Cr_2O_3)_{70}(ZrO_2)_5$ $(Si_{5.7}Cr_{31.8}Zr_{1.1}O_{61.4})$ | Not Caused | 1,000 |
| Ex. 13 | $(SiO_2)_{15}(Cr_2O_3)_{80}(ZrO_2)_5$ $(Si_{3.3}Cr_{34.8}Zr_{1.1}O_{60.8})$ | $(SiO_2)_5(Cr_2O_3)_{90}(ZrO_2)_5$ $(Si_{1.04}Cr_{37.5}Zr_{1.04}O_{60.42})$ | Not Caused | 500 |
| Com. Ex. 5 | $(SiO_2)_5(Cr_2O_3)_5(ZrO_2)_{90}$ $(Si_{1.6}Cr_{3.2}Zr_{29.0}O_{66.2})$ | $(SiO_2)_5(Cr_2O_3)_{10}(ZrO_2)_{85}$ $(Si_{1.6}Cr_{6.2}Zr_{26.6}O_{65.6})$ | Caused (I side-C-I side) | 7,000 |
| Com. Ex. 6 | $(SiO_2)_5(Cr_2O_3)_5(ZrO_2)_{90}$ $(Si_{1.6}Cr_{3.2}Zr_{29.0}O_{66.2})$ | $(SiO_2)_5(Cr_2O_3)_{70}(ZrO_2)_{25}$ $(Si_{1.1}Cr_{31.8}Zr_{5.7}O_{61.4})$ | Caused (I side) | 1,000 |
| Com. Ex. 7 | $(SiO_2)_5(Cr_2O_3)_{10}(ZrO_2)_{85}$ $(Si_{1.6}Cr_{6.2}Zr_{26.6}O_{65.6})$ | $(SiO_2)_5(Cr_2O_3)_{10}(ZrO_2)_{85}$ $(Si_{1.6}Cr_{6.2}Zr_{26.6}O_{65.6})$ | Caused (C-Incidence side) | 7,000 |
| Com. Ex. 8 | $(SiO_2)_{35}(Cr_2O_3)_{30}(ZrO_2)_{35}$ $(Si_{9.7}Cr_{16.7}Zr_{9.7}O_{63.9})$ | $(SiO_2)_{40}(Cr_2O_3)_{30}(ZrO_2)_{30}$ $(Si_{11.1}Cr_{16.7}Zr_{8.3}O_{63.9})$ | Caused (C-Incidence side) | 10,000 |

As shown in Table 2, in each sample of the optical information recording medium used for Examples 7 to 13, the counter-incidence side dielectric film 28 had a Si atom concentration that is lower than that of the incidence side dielectric film 26. Moreover, the incidence side dielectric film 26 has a Cr atom concentration of not less than 6 at %, and the counter-incidence side dielectric film 28 has a Cr atom concentration of not less than 9 at %. Further, where the material of the incidence side dielectric film 26 is represented by $y_1$ mol % $SiO_2$-$x_1$ mol % $Cr_2O_3$-$(100-x_1-y_1)$ mol % $ZrO_2$, and the material of the counter-incidence side dielectric film 28 is represented by $y_2$ mol % $SiO_2$-$x_2$ mol % $Cr_2O_3$-$(100-x_2-y_2)$ mol % $ZrO_2$, in each sample of the optical information recording medium used for Examples 7 to 13, $10 \leq x_1$, $5 \leq y_1 \leq 40$, $15 \leq x_1+y_1 \leq 95$, $20 \leq x_2$, $0 < y_2 \leq 35$, $20 < x_2+y_2 \leq 95$ are satisfied. Further, $y_1 > y_2$ also is satisfied. In each of the above-mentioned samples of the optical information recording medium used for Examples 7 to 13, peeling was prevented from being caused between the incidence side dielectric film 26 and the recording film 27 and between the counter-incidence side dielectric film 28 and the recording film 27, and sufficient adhesion was attained there between. Further, in each sample of the optical information recording medium used for Examples 7 to 12, an excellent possible number of times of repeated rewriting was achieved, and the number obtained was not less than 1,000 times. On the other hand, in the optical information recording medium of Example 13, only an insufficient possible number of times of repeated rewriting was obtained, and the number obtained was 500 times. This confirmed that as $SiO_2$ contents of the incidence side dielectric film 26 and the counter-incidence side dielectric film 28 are decreased, or as $Cr_2O_3$ contents of these dielectric films are increased, the possible number of times of repeated rewriting was decreased gradually. Thus, it was also revealed that as long as adhesion could be secured, $Cr_2O_3$ should be contained in the smallest possible amount (preferably, $x_1 \leq 60$ and $x_2 \leq 70$ are satisfied), and $SiO_2$ should be contained in the largest possible amount.

Conceivably, in each sample of the optical information recording medium used for Comparative Examples 5 and 6, the incidence side dielectric film 26 had a Cr atom concentration that was too low, and thus irrespective of a relationship between the Si atom concentration of the incidence side dielectric film 26 and the Si atom concentration of the counter-incidence side dielectric film 28, peeling was caused between the incidence side dielectric film 26 and the recording film 27, and only insufficient adhesion was obtained there between. Further, in the case of Comparative Example 5, the Cr atom concentration of the counter-incidence side dielectric film 28 also was too low, and thus peeling was caused also between the counter-incidence side dielectric film 28 and the recording film 27. Further, in the optical information recording medium of Comparative Example 7, the counter-incidence side dielectric film 28 and the incidence side dielectric film 26 were equal in the Si atom concentration, and the Cr atom concentration of the counter-incidence side dielectric film 28 was too low, so that peeling was caused also between the counter-incidence side dielectric film 28 and the recording film 27. Further, in the optical information recording medium of Comparative Example 8, the counter-incidence side dielectric film 28 had a Si atom concentration that is higher than that of the incidence side dielectric film 26, and thus peeling was caused between the counter-incidence side dielectric film 28 and the recording film 27.

Also with respect to each of the optical information recording medium 3 shown in FIG. 3 and the optical information recording medium 5 shown in FIG. 4, an evaluation was performed on the first information layer for adhesion and a repeated rewriting capability in the same manner, and similar results were obtained.

Example 14

As the optical information recording medium of Example 14, the optical information recording medium 1 shown in FIG. 1 was manufactured and evaluated for the property of the information layer 12.

To be specific, initially, a polycarbonate substrate (having a diameter of 120 mm and a thickness of 1,100 μm) on which guide grooves (having a depth of 20 nm and a track pitch of 0.32 μm) for guiding a laser beam were formed was prepared as the substrate 11. Then, on the polycarbonate substrate, an Ag—Pd—Cu film (thickness: 80 nm) as the reflective film 20, an Al film (thickness: 5 nm) as the metal film 19, a ZnS—SiO$_2$ film (thickness: 22 nm, ZnS: 80 mol %, SiO$_2$: 20 mol %) as the counter-incidence side protective film 18, a SiO$_2$—Cr$_2$O$_3$—ZrO$_2$ film (thickness: 5 nm, SiO$_2$: 20 mol %, Cr$_2$O$_3$: 30 mol %, ZrO$_2$: 50 mol %) as the counter-incidence side dielectric film 17, a Ge$_{22}$Sb$_2$Te$_{25}$ film (thickness: 10 nm) as the recording film 16, a SiO$_2$—Cr$_2$O$_3$—ZrO$_2$ film (thickness: 5 nm, SiO$_2$: 35 mol %, Cr$_2$O$_3$: 30 mol %, ZrO$_2$: 35 mol %) as the incidence side dielectric film 15, and a ZnS—SiO$_2$ film (thickness: 60 nm, ZnS: 80 mol %, SiO$_2$: 20 mol %) as the incidence side protective film 14 were laminated in order by sputtering using targets having a predetermined composition.

By calculation based on the matrix method, the respective thicknesses of the incidence side protective film 14 and the counter-incidence side protective film 18 were determined precisely so that at a wavelength of 405 nm, an amount of reflected light obtained when the recording film 16 was in a crystalline phase could be larger than an amount of reflected light obtained when the recording film 16 was in an amorphous phase, a change in an amount of reflected light between when the recording film 16 was in the crystalline phase and when the recording film 16 was in the amorphous phase could be increased, and light absorption of the recording film 16 could be increased.

Then, an ultraviolet curable resin was applied on the incidence side protective film 14. After that, a polycarbonate substrate (having a diameter of 120 mm and a thickness of 90 μm) was bonded to the incidence side protective film 14. A laminate thus obtained was subjected to spin coating followed by ultraviolet irradiation, where the resin was allowed to cure, and thus the transparent layer 13 was formed. Finally, an initializing process for crystallizing an entire surface of the recording film 16 was performed.

In the above-mentioned manner, the optical information recording medium of Example 14 was manufactured.

With respect to the optical information recording medium of this example, evaluations for adhesion and a repeated rewriting capability were performed in same manner as in the case of the samples of the optical recording medium used for Examples 1 to 13. As a result, peeling was not caused between each of the dielectric films 15 and 17 and the recording film 16, and a possible number of times of repeated rewriting of not less than 10,000 times was attained. Further, an excellent jitter value of 9% was obtained in rewriting at the first time.

Example 15

As the optical information recording medium of Example 15, the optical information recording medium 3 shown in FIG. 3 was manufactured and evaluated for the respective properties of the first information layer 32$_1$ and the second information layer 32$_2$.

Initially, the second information layer 32$_2$ was formed on the substrate 31. To be specific, initially, a polycarbonate substrate (having a diameter of 120 mm and a thickness of 1,100 μm) on which guide grooves (having a depth of 20 nm and a track pitch of 0.32 μm) for guiding a laser beam were formed was prepared as the substrate 31. Then, on the polycarbonate substrate, an Ag—Pd—Cu film (thickness: 80 nm) as the reflective film 41, an Al film (thickness: 5 nm) as the metal film 40, a ZnS—SiO$_2$ layer (thickness: 22 nm, ZnS: 80 mol %, SiO$_2$: 20 mol %) as the counter-incidence side protective film 39, a SiO$_2$—Cr$_2$O$_3$—ZrO$_2$ film (thickness: 5 nm, SiO$_2$: 20 mol %, Cr$_2$O$_3$: 30 mol %, ZrO$_2$: 50 mol %) as the counter-incidence side dielectric film 38, a Ge$_{22}$Sb$_2$Te$_{25}$ film (thickness: 10 nm) as the recording film 37, a SiO$_2$—Cr$_2$O$_3$—ZrO$_2$ film (thickness: 5 nm, SiO$_2$: 35 mol %, Cr$_2$O$_3$: 30 mol %, ZrO$_2$: 35 mol %) as the incidence side dielectric film 26, and a ZnS—SiO$_2$ film (thickness: 60 nm, ZnS: 80 mol %, SiO$_2$: 20 mol %) as the incidence side protective film 25 were laminated in this order by sputtering.

By calculation based on the matrix method, the respective thicknesses of the incidence side protective film 35 and the counter-incidence side protective film 39 were determined precisely so that at a wavelength of 405 nm, an amount of reflected light obtained when the recording film 37 was in a crystalline phase could be larger than an amount of reflected light obtained when the recording film 37 was in an amorphous phase, a change in an amount of reflected light between when the recording film 37 was in the crystalline phase and when the recording film 37 was in the amorphous phase could be increased, and light absorption of the recording film 37 could be increased.

Next, an ultraviolet curable resin was applied on the incidence side protective film 35. A transfer substrate on which guide grooves (having a depth of 20 nm and a track pitch of 0.32 μm) were formed was set on the incidence side protective film 35 with the ultraviolet curable resin applied thereon. A laminate thus obtained was subjected to spin coating, and the resin was allowed to cure. After that, the transfer substrate was peeled off therefrom. This process allowed the formation of the optical separation layer 34 with a surface (a surface on a side of the first information layer 32$_1$ to be formed in a following process) on which the guide grooves for guiding a laser beam were formed. Subsequently, an initializing process for crystallizing an entire surface of the recording film 37 was performed.

Next, the first information layer 32$_1$ was formed on the optical separation layer 34. Specifically, on the optical separation layer 34, a TiO$_2$ film (thickness: 20 nm) as the transmittance adjusting film 37, an Ag—Pd—Cu film (thickness: 10 nm) as the reflective film 29, a SiO$_2$—Cr$_2$O$_3$—ZrO$_2$ film (thickness: 10 nm, SiO$_2$: 20 mol %, Cr$_2$O$_3$: 30 mol %, ZrO$_2$: 50 mol %) as the counter-incidence side dielectric film 28, a Ge$_{22}$Sb$_2$Te$_{25}$ film (thickness: 6 nm) as the recording film 27, a SiO$_2$—Cr$_2$O$_3$—ZrO$_2$ film (thickness: 5 nm, SiO$_2$: 35 mol %, Cr$_2$O$_3$: 30 mol %, ZrO$_2$: 35 mol %) as the incidence side dielectric film 26, and a ZnS—SiO$_2$ film (thickness: 45 nm, ZnS: 80 mol %, SiO$_2$: 20 mol %) as the incidence side protective film 25 were laminated in this order by sputtering.

After that, an ultraviolet curable resin was applied on the incidence side protective film 25. Then, a polycarbonate substrate (having a diameter of 120 mm and a thickness of 90 μm) was bonded to the incidence side protective film 25, and a laminate thus obtained was subjected to spin coating followed by ultraviolet irradiation, where the resin was allowed to cure, and thus the transparent layer 33 was formed. Finally, an initializing process for crystallizing an entire surface of the recording film 27 was performed.

In the above-mentioned manner, the optical information recording medium of Example 15 was manufactured.

With respect to the optical information recording medium of this example, evaluations for adhesion and a repeated rewriting capability were performed in the same manner as in the case of the samples of the optical information recording medium used for Examples 1 to 13. As a result, in each of the first information layer 32$_1$ and the second information layer 32$_2$, peeling was not caused between the incidence side dielectric film and the recording film and between the counter-incidence side dielectric film and the recording film, and a possible number of times of repeated rewriting of not less than 10,000 times was attained. Further, in each of the first information layer $32_1$ and the second information layer $32_2$, an excellent jitter value of not more than 10% was obtained in rewriting at the first time.

In each of Examples 1 to 15, $ZrO_2$ was used as the compound (M1)$O_2$ contained in each of the incidence side dielectric film and the counter-incidence side dielectric film. The same effect also was obtained in each of the case of using $HfO_2$ and the case of using a half-and-half mixture of $ZrO_2$ and $HfO_2$.

As described in the foregoing discussion, according to the optical information recording medium according to the present invention, adhesion between a recording film and each of dielectric films arranged on both sides of the recording film can be improved, and thus an optical information recording medium that is highly reliable and allows recorded information to be preserved for a long time can be realized.

The embodiments or examples disclosed in Detailed Description of The Invention are intended to illustrate the technical aspects of the invention and not to limit the invention thereto. The invention may be embodied in other forms without departing from the spirit and the scope of the invention as indicated by the appended claims and is to be broadly construed.

What is claimed is:

1. An optical information recording medium including a substrate and an information layer, the information layer comprising:

a first dielectric film that contains Cr, O and at least one element (M1) selected from Zr and Hf;

a recording film that is provided on the first dielectric film and changed in optical property reversibly by irradiation of laser beams; and a second dielectric film that is provided on the recording film and contains Cr, O and the at least one element (M1) selected from Zr and Hf, which are provided in this order from a side on which laser beams are incident, wherein the first dielectric film has a Cr atom concentration of at least 6 at %, the second dielectric film has a Cr atom concentration of at least 9 at %, and the Cr atom concentration of the second dielectric film is larger than the Cr atom concentration of the first dielectric film.

2. The optical information recording medium according to claim 1, wherein where the element M1, Cr and O that are contained in the first dielectric film are represented by a composition formula $Cr_{A1}(M1)_{B1}O_{(100-A1-B1)}$, A1 and B1 satisfy:

$6<A1<29$; and $9<B1<29$, respectively, and where the element M1, Cr and O that are contained in the second dielectric film are represented by a composition formula $Cr_{A2}(M1)_{B2}O_{(100-A2-B2)}$, A2 and B2 satisfy:

$11<A2<32$; and $6<B2<24$, respectively.

3. The optical information recording medium according to claim 1, wherein the first dielectric film contains a first mixture of $Cr_2O_3$ and (M1)$O_2$, and in the first mixture, $Cr_2O_3$ is contained in an amount of not less than 10 mol % and not more than 60 mol %, the second dielectric film contains a second mixture of $Cr_2O_3$ and (M1)$O_2$, and in the second mixture, $Cr_2O_3$ is contained in an amount of not less than 20 mol % and not more than 80 mol %, and the second mixture has a $Cr_2O_3$ concentration (mol %) higher than a $Cr_2O_3$ concentration (mol %) of the first mixture.

4. The optical information recording medium according to claim 1, wherein a difference between the Cr atom concentration of the first dielectric film and the Cr atom concentration of the second dielectric film is not less than 3 at % and not more than 15 at %.

5. An optical information recording medium including a substrate and an information layer, the information layer comprising:

a first dielectric film that contains Cr, Si, O and at least one element (M1) selected from Zr and Hf;

a recording film that is provided on the first dielectric film and changed in optical property reversibly by irradiation of laser beams; and a second dielectric film that is provided on the recording film and contains Cr, Si, O and the at least one element (M1) selected from Zr and Hf, which are provided in this order from a side on which laser beams are incident, wherein the first dielectric film has a Cr atom concentration of at least 6 at %, the second dielectric film has a Cr atom concentration of at least 9 at %, and a Si atom concentration of the second dielectric film is smaller than a Si atom concentration of the first dielectric film.

6. The optical information recording medium according to claim 5, wherein the Cr atom concentration of the second dielectric film is higher than the Cr atom concentration of the first dielectric film.

7. The optical information recording medium according to claim 5, wherein where the element M1, Cr, Si and O that are contained in the first dielectric film are represented by a composition formula $Si_{C3}Cr_{A3}M1_{B3}O_{(100-A3-B3-C3)}$, A3, B3 and C3 satisfy:

$6<A3<32$;

$1<B3$; and $1<C3<13$, respectively, and where the element M1, Cr, Si and O that are contained in the second dielectric film are represented by a composition formula $Si_{C4}Cr_{A4}M1_{B4}O_{(100-A4-B4-C4)}$, A4, B4 and C4 satisfy:

$11<A4<35$;

$1<B4$; and $0<C4<11$, respectively.

8. The optical information recording medium according to claim 7, wherein A3<A4 is satisfied.

9. The optical information recording medium according to claim 5, wherein the first dielectric film contains a first mixture of $SiO_2$, $Cr_2O_3$ and $(M1)O_2$, and in the first mixture, $SiO_2$, $Cr_2O_3$ and $SiO_2+Cr_2O_3$ are contained in the respective amounts shown below:

$SiO_2$: not less than 5 mol % and not more than 40 mol %;

$Cr_2O_3$: not less than 10 mol % and not more than 70 mol %; and $SiO_2+Cr_2O_3$: not less than 15 mol % and not more than 95 mol %, the second dielectric film contains a second mixture of $SiO_2$, $Cr_2O_3$ and $(M1)O_2$, and in the second mixture, $SiO_2$ $Cr_2O_3$ and $SiO_2+Cr_2O_3$ are contained in the respective amounts shown below:

$SiO_2$: not more than 35 mol %;

$Cr_2O_3$: not less than 20 mol % and not more than 80 mol %; and $SiO_2+Cr_2O_3$: more than 20 mol % and not more than 95 mol %, and the second dielectric film has a $SiO_2$ concentration (mol %) lower than a $SiO_2$ concentration (mol %) of the first dielectric film.

10. The optical information recording medium according to claim 9, wherein the second mixture has a $Cr_2O_3$ concentration (mol %) higher than a $Cr_2O_3$ concentration (mol %) of the first mixture.

11. The optical information recording medium according to claim 5, wherein a difference between the Si atom concentration of the first dielectric film and the Si atom concentration of the second dielectric film is not less than 1 at % and not more than 10 at %.

12. The optical information recording medium according to claim 1, wherein a plurality of the information layers are provided.

13. The optical information recording medium according to claim 5, wherein a plurality of the information layers are provided.

14. The optical information recording medium according to claim 1, wherein the recording film contains Ge, Te and at least one element (M2) selected from Sb and Bi, and where the element M2, Ge and Te are represented by a composition formula $Ge_a(M2)_bTe_{3+a}$, $0 < a \leq 60$, and $1.5 \leq b \leq 7$ are satisfied.

15. The optical information recording medium according to claim 5, wherein the recording film contains Ge, Te and at least one element (M2) selected from Sb and Bi, and where the element M2, Ge and Te are represented by a composition formula $Ge_a(M2)_bTe_{3+a}$, $0 < a \leq 60$, and $1.5 \leq b \leq 7$ are satisfied.

16. The optical information recording medium according to claim 14, wherein in the composition formula $Ge_a(M2)_bTe_{3+a}$, at least a part of Ge is substituted by at least one element (M3) selected from Sn and Pb.

17. The optical information recording medium according to claim 15, wherein in the composition formula $Ge_a(M2)_bTe_{3+a}$, at least a part of Ge is substituted by at least one element (M3) selected from Sn and Pb.

18. The optical information recording medium according to claim 1, wherein the recording film contains Ge, Te, at least one element (M2) selected from Sb and Bi, and at least one element (M4) selected from the group consisting of Si, Ti, V, Cr, Mn, Fe, Co, Ni, Cu, Se, Zr, Nb, Mo, Ru, Rh, Pd, Ag, In, Sn, Ta, W, Os, Ir, Pt, Gd, Tb, Dy and Au, and where the elements M2 and M4, are represented by a composition formula $(Ge_a(M2)_bTe_{3+a})_{100-c}(M4)_c$, $0 < a \leq 60$, $1.5 \leq b \leq 7$, and $0 < c \leq 20$ are satisfied.

19. The optical information recording medium according to claim 5, wherein the recording film contains Ge, Te, at least one element (M2) selected from Sb and Bi, and at least one element (M4) selected from the group consisting of Si, Ti, V, Cr, Mn, Fe, Co, Ni, Cu, Se, Zr, Nb, Mo, Ru, Rh, Pd, Ag, In, Sn, Ta, W, Os, Ir, Pt, Gd, Tb, Dy and Au, and where the elements M2 and M4, are represented by a composition formula $(Ge_a(M2)_bTe_{3+a})_{100-c}(M4)_c$, $0 < a \leq 60$, $1.5 \leq b \leq 7$, and $0 < c \leq 20$ are satisfied.

20. The optical information recording medium according to claim 1, wherein the recording film contains Sb, Te, and one element (M5) selected from a group consisting of Ag, In, Ge, Sn, Se, Bi, Au and Mn, and where Sb, Te, and the element M5 are represented by a composition formula $(Sb_dTe_{100-d})_{100-e}(M5)_e$, $50 \leq d \leq 95$, and $0 < e \leq 20$ are satisfied.

21. The optical information recording medium according to claim 5, wherein the recording film contains Sb, Te, and one element (M5) selected from a group consisting of Ag, In, Ge, Sn, Se, Bi, Au and Mn, and where Sb, Te, and the element M5 are represented by a composition formula $(Sb_dTe_{100-d})_{100-e}(M5)_e$, $50 \leq d \leq 95$, and $0 < e \leq 20$ are satisfied.

22. The optical information recording medium according to claim 1, wherein the information layer further comprises a protective film provided so as to be in contact with the first dielectric film on a side of the first dielectric film on which laser beams are incident, and the protective film contains at least one selected from the group consisting of $TiO_2$, $ZrO_2$, $HfO_2$, $ZnO$, $Nb_2O_5$, Ta$_2$O$_5$, SiO$_2$, Al$_2$O$_3$, Bi$_2$O$_3$, C—N, Ti—N, Zr—N, Nb—N, Ta—N, Si—N, Ge—N, Cr—N, Al—N, Ge—Si—N, Ge—Cr—N, ZnS, and SiC.

23. The optical information recording medium according to claim 5,
wherein the information layer further comprises a protective film provided so as to be in contact with the first dielectric film on a side of the first dielectric film on which laser beams are incident, and
the protective film contains at least one selected from the group consisting of TiO$_2$, ZrO$_2$, HfO$_2$, ZnO, Nb$_2$O$_5$, Ta$_2$O$_5$, SiO$_2$, Al$_2$O$_3$, Bi$_2$O$_3$, C—N, Ti—N, Zr—N, Nb—N, Ta—N, Si—N, Ge—N, Cr—N, Al—N, Ge—Si—N, Ge—Cr—N, ZnS, and SiC.

24. The optical information recording medium according to claim 1,
wherein the information layer further comprises a reflective film provided on a side of the second dielectric film opposite a side on which laser beams are incident, and
the reflective film contains at least one element selected from Ag, Au, Cu and Al.

25. The optical information recording medium according to claim 5,
wherein the information layer further comprises a reflective film provided on a side of the second dielectric film opposite a side on which laser beams are incident, and
the reflective film contains at least one element selected from Ag, Au, Cu and Al.

26. The optical information recording medium according to claim 24,
wherein the information layer further comprises a transmittance adjusting film provided so as to be in contact with the reflective film on a side of the reflective film opposite a side on which laser beams are incident, and
the transmittance adjusting film contains at least one selected from the group consisting of TiO$_2$, ZrO$_2$, HfO$_2$, ZnO, Nb$_2$O$_5$, Ta$_2$O$_5$, SiO$_2$, Al$_2$O$_3$, Bi$_2$O$_3$, Ti—N, Zr—N, Nb—N, Ta—N, Si—N, Ge—N, Cr—N, Al—N, Ge—Si—N, Ge—Cr—N, and ZnS.

27. The optical information recording medium according to claim 25,
wherein the information layer further comprises a transmittance adjusting film provided so as to be in contact with the reflective film on a side of the reflective film opposite a side on which laser beams are incident, and
the transmittance adjusting film contains at least one selected from the group consisting of TiO$_2$, ZrO$_2$, HfO$_2$, ZnO, Nb$_2$O$_5$, Ta$_2$O$_5$, SiO$_2$, Al$_2$O$_3$, Bi$_2$O$_3$, Ti—N, Zr—N, Nb—N, Ta—N, Si—N, Ge—N, Cr—N, Al—N, Ge—Si—N, Ge—Cr—N, and ZnS.

28. The optical information recording medium according to claim 1,
wherein a first to n-th information layers (n represents a natural number not smaller than 2) are laminated in this order from the side on which laser beams are incident, and
at least one of the first to n-th information layers is the information layer.

29. The optical information recording medium according to claim 5,
wherein a first to n-th information layers (n represents a natural number not smaller than 2) are laminated in this order from the side on which laser beams are incident, and
at least one of the first to n-th information layers is the information layer.

30. The optical information recording medium according to claim 28, wherein the first information layer is the information layer.

31. The optical information recording medium according to claim 29, wherein the first information layer is the information layer.

32. The optical information recording medium according to claim 1, wherein the first dielectric film further contains Si.

33. A method for manufacturing an optical information recording medium, the optical information recording medium being a medium as claimed in claim 1, comprising:
forming the first dielectric film by sputtering using a first sputtering target containing at least Cr, O and the at least one element (M1) selected from Zr and Hf;
forming the recording film that is changed in optical property reversibly by irradiation of laser beams; and
forming the second dielectric film by sputtering using a second sputtering target containing at least Cr, O and the at least one element (M1) selected from Zr and Hf,
wherein a Cr atom concentration of the second sputtering target is larger than a Cr atom concentration of the first sputtering target.

34. The method according to claim 33,
wherein where the element M1, Cr and O that are contained in the first sputtering target are represented by a composition formula Cr$_{D1}$M1$_{E1}$O$_{100-D1-E1}$, D1 and E1 satisfy:

$3<D1<29$; and $9<E1<31$, and where the element M1, Cr and O that are contained in the second sputtering target are represented by a composition formula Cr$_{D2}$M1$_{E2}$O$_{100-D2-E2}$, D2 and E2 satisfy:

$9<D2<32$; and $6<E2<26$.

35. The method according to claim 33,
wherein the first sputtering target contains a first mixture of Cr$_2$O$_3$ and (M1)O$_2$, and in the first mixture, Cr$_2$O$_3$ is contained in an amount of not less than 5 mol % and not more than 60 mol %,
the second sputtering target contains a second mixture of Cr$_2$O$_3$ and (M1)O$_2$, and in the second mixture, Cr$_2$O$_3$ is contained in an amount of not less than 15 mol % and not more than 80 mol %, and
the second mixture has a Cr$_2$O$_3$ concentration (mol %) higher than a Cr$_2$O$_3$ concentration (mol %) of the first mixture.

36. A method for manufacturing an optical information recording medium, the optical information recording medium being a medium as claimed in claim 5, comprising:
forming the first dielectric film by sputtering using a first sputtering target containing at least Si, Cr, O and the at least one element (M1) selected from Zr and Hf;
forming the recording film that is changed in optical property reversibly by irradiation of laser beams; and
forming the second dielectric film by sputtering using a second sputtering target containing at least Si, Cr, O and the at least one element (M1) selected from Zr and Hf,
wherein a Si atom concentration of the second sputtering target is smaller than a Si atom concentration of the first sputtering target.

37. The method according to claim 36,
wherein the second sputtering target has a Cr atom concentration higher than a Cr atom concentration of the first sputtering target.

38. The method according to claim 36,
wherein where the element M1, Si, Cr and O that are contained in the first sputtering target are represented by a composition formula $Si_{F3}Cr_{D3}M1_{E3}O_{100-D3-E3-F3}$, D3, E3 and F3 satisfy:

$3<D3<32;$ $1<E3;$ and $1<F3<13,$ and where the element M1, Si, Cr and O that are contained in the second sputtering target are represented by a composition formula $Si_{F4}Cr_{D4}M1_{E4}O_{100-D4-E4-F4}$, D4, E4 and F4 satisfy:

$9<D4<35;$ $1<E4;$ and $1<F4<11.$

39. The method according to claim 36,
wherein the first sputtering target contains a first mixture of $SiO_2$, $Cr_2O_3$ and $(M1)O_2$, and in the first mixture, $SiO_2$, $Cr_2O_3$ and $SiO_2+Cr_2O_3$ are contained in the respective amounts shown below:

$SiO_2$: not less than 5 mol % and not more than 40 mol %;

$Cr_2O_3$: not less than 5 mol % and not more than 70 mol %; and $SiO_2+Cr_2O_3$: not less than 10 mol % and not more than 95 mol %, the second sputtering target contains a second mixture of $SiO_2$, $Cr_2O_3$ and $(M1)O_2$, and in the second mixture, $SiO_2$, $Cr_2O_3$ and $SiO_2+Cr_2O_3$ are contained in the respective amounts shown below:

$SiO_2$: not more than 35 mol %;

$Cr_2O_3$: not less than 15 mol % and not more than 80 mol %; and $SiO_2+Cr_2O_3$: more than 10 mol % and not more than 95 mol %, and the second mixture has a $SiO_2$ concentration (mol %) lower than a $SiO_2$ concentration (mol %) of the first mixture.

40. A method for manufacturing an optical information recording medium, the optical information recording medium being a medium with a multi-layer structure comprising a plurality of information layers,
wherein at least of the plurality of information layers is formed by a method as claimed in claim 33.

41. A method for manufacturing an optical information recording medium, the optical information recording medium being a medium with a multi-layer structure comprising a plurality of information layers,
wherein at least of the plurality of information layers is formed by a method as claimed in claim 36.

* * * * *

UNITED STATES PATENT AND TRADEMARK OFFICE
CERTIFICATE OF CORRECTION

PATENT NO. : 6,841,217 B2
DATED : January 11, 2005
INVENTOR(S) : Nishihara et al.

It is certified that error appears in the above-identified patent and that said Letters Patent is hereby corrected as shown below:

Column 40,
Line 50, "$_A3$, B3 and C3" should read -- A3, B3 and C3 --.

Signed and Sealed this

Twenty-fourth Day of January, 2006

JON W. DUDAS
*Director of the United States Patent and Trademark Office*